United States Patent
Chen et al.

(10) Patent No.: US 10,827,485 B2
(45) Date of Patent: Nov. 3, 2020

(54) NARROWBAND DEPENDENT SUBFRAME AVAILABILITY FOR MTC

(71) Applicant: QUALCOMM Incorporated, San Diego, CA (US)

(72) Inventors: Wanshi Chen, San Diego, CA (US); Hao Xu, San Diego, CA (US); Madhavan Srinivasan Vajapeyam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 194 days.

(21) Appl. No.: 15/097,428

(22) Filed: Apr. 13, 2016

(65) Prior Publication Data

US 2016/0309468 A1    Oct. 20, 2016

Related U.S. Application Data

(60) Provisional application No. 62/148,843, filed on Apr. 17, 2015.

(51) Int. Cl.
*H04W 4/70*    (2018.01)
*H04W 76/10*    (2018.01)
(Continued)

(52) U.S. Cl.
CPC ......... *H04W 72/0446* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

| 2009/0109969 A1* | 4/2009 | Cotignola | H04M 3/005 370/389 |
| 2012/0218967 A1* | 8/2012 | Noh | H04W 24/00 370/329 |

(Continued)

FOREIGN PATENT DOCUMENTS

| EP | 2919402 A1 | 9/2015 |
| JP | 2014526159 A | 10/2014 |

(Continued)

OTHER PUBLICATIONS

ISA/EP, International Search Report and Written Opinion of the International Searching Authority, Int'l. App. No. PCT/US2016/027560, dated Jul. 11, 2016, European Patent Office, Rijswijk, NL, 17 pgs.

(Continued)

*Primary Examiner* — Angel T Brockman
(74) *Attorney, Agent, or Firm* — Holland & Hart LLP

(57) ABSTRACT

Methods, systems, and devices for wireless communication are described. A user equipment (UE) and a base station may establish a communication link over a carrier including multiple narrowband regions. One or both of the devices may determine a subframe availability associated with each of the narrowband regions and may communicate on one or more of the regions according to the availability. In some cases, the availability may depend on a channel configuration, such as the presence of reference signals (e.g., positioning reference signals (PRS) or discovery reference singles (DRS)) covering a portion of the overall bandwidth of the carrier. In some cases, transmission time interval (TTI) bundling or frequency hopping may depend on the subframe availability.

32 Claims, 15 Drawing Sheets

(51) Int. Cl.
*H04W 72/04* (2009.01)
*H04W 74/08* (2009.01)
*H04W 72/00* (2009.01)
*H04L 5/00* (2006.01)
*H04L 27/00* (2006.01)
*H04L 1/18* (2006.01)

(52) U.S. Cl.
CPC .......... *H04W 4/70* (2018.02); *H04W 72/005* (2013.01); *H04W 74/08* (2013.01); *H04W 76/10* (2018.02); *H04L 1/189* (2013.01); *H04L 5/0048* (2013.01); *H04L 27/0006* (2013.01); *H04W 72/048* (2013.01)

(56) References Cited

U.S. PATENT DOCUMENTS

| | | | |
|---|---|---|---|
| 2013/0301552 A1 | 11/2013 | Xu et al. | |
| 2014/0301305 A1 | 10/2014 | Xu et al. | |
| 2015/0245350 A1* | 8/2015 | Webb | H04L 5/0053 370/329 |
| 2015/0296518 A1* | 10/2015 | Yi | H04L 1/08 370/336 |
| 2016/0226639 A1* | 8/2016 | Xiong | H04L 5/0053 |
| 2017/0102462 A1* | 4/2017 | Gupta | G01S 19/12 |

FOREIGN PATENT DOCUMENTS

| | | |
|---|---|---|
| JP | 2015513848 A | 5/2015 |
| WO | WO-2013000814 A2 | 1/2013 |
| WO | WO-2013127634 A1 | 9/2013 |
| WO | WO-2013173673 A2 | 11/2013 |
| WO | WO-2014109621 A1 | 7/2014 |

OTHER PUBLICATIONS

Sony, "MTC Operation Using ePDCCH," 3GPP TSG-RAN WG1 Meeting #79, R1-145019, San Francisco, USA, Nov. 17-21, 2014, 17 pgs., 3rd Generation Partnership Project.

LG Electronics: "PDSCH Related Issues for MTC", 3GPP TSG RAN WG1 Meeting #80, 3GPP Draft; R1-150200, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 9, 2015-Feb. 13, 2015, Feb. 8, 2015 (Feb. 8, 2015), pp. 1-8, Retrieved from the Internet: URL: http://www.3gpp.org/ftp/Meetings_3GPP_SYNC/RAN1/Docs/ [retrieved on Feb. 8, 2015].

LG Electronics: "Simultaneous Data Reception of MTC Ues", 3GPP TSG-RAN WG1#80bis, R1-151496, Apr. 11, 2015, 4 Pages, URL: http://www.3gpp.org/ftp/tsg_ran/WG1_RL1/TSGR1_80b/Docs/R1-151496.zip.

LG Electronics: "Text Proposal on Coverage Enhancement for a MTC UE", 3GPP TSG RAN WG1 #72, 3GPP Draft, R1-130264, vol. RAN WG1, No. St Julian, Jan. 18, 2013 (Jan. 18, 2013), 16 Pages, XP050663396, 650, Route Des Lucioles; F-06921 Sophia-Antipolis Cedex; France, Retrieved from the Internet: URL: http://www.3gpp.org/ftp/tsg_ran/WG1_RL1/TSGR1_72/Docs/ [retrieved on Jan. 18, 2013] sections 9.4.1, 9.5.4 and 9.5.5.

* cited by examiner

NARROWBAND DEPENDENT SUBFRAME AVAILABILITY FOR MTC

CROSS REFERENCES

The present application for patent claims priority to U.S. Provisional Patent Application No. 62/148,843 by Chen, et al., entitled "Narrowband Dependent Subframe Availability For MTC," filed Apr. 17, 2015, assigned to the assignee hereof.

BACKGROUND

The following relates generally to wireless communication, and more specifically to narrowband dependent subframe availability for communication between devices, including machine-type communication (MTC) devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a UE such as a low-cost or low-complexity MTC device may communicate with a base station in a narrow subband, or in multiple narrowband regions, of a cell's frequency range. The base station may also transmit signals or channels that occupy only a portion of the overall frequency range of the cell. The signals may overlap different narrowband regions to different degrees. This may complicate scheduled communications on different narrowband regions.

SUMMARY

A user equipment (UE) and a base station may establish a communication link over a carrier that includes multiple narrowband regions. Either or both of the devices may determine a subframe availability associated with one or several narrowband regions of the carrier, and the devices may communicate based on the subframe availability. In some cases, the subframe availability may depend on a channel configuration, including the presence of reference signals (e.g., positioning reference signals (PRS) or discovery reference singles (DRS)) covering a portion of the overall bandwidth of the carrier, which may include one or some of the narrowband regions. In some cases, transmission time interval (TTI) bundling or frequency hopping may depend, e.g., in a narrowband region, on the subframe availability.

A method of wireless communication is described. The method may include establishing a communication link over a carrier comprising a first narrowband region and a second narrowband region, determining a first subframe availability for the first narrowband region and a second subframe availability for the second narrowband region, and communicating using the first narrowband based at least in part on the first subframe availability or using the second narrowband region based at least in part on the second subframe availability.

An apparatus for wireless communication is described. The apparatus may include means for establishing a communication link over a carrier comprising a first narrowband region and a second narrowband region, means for determining a first subframe availability for the first narrowband region and a second subframe availability for the second narrowband region, and means for communicating using the first narrowband based at least in part on the first subframe availability or using the second narrowband region based at least in part on the second subframe availability.

A further apparatus for wireless communication is described. The apparatus may include a processor, memory in electronic communication with the processor, and instructions stored in the memory and operable, when executed by the processor, to cause the apparatus to establish a communication link over a carrier comprising a first narrowband region and a second narrowband region, determine a first subframe availability for the first narrowband region and a second subframe availability for the second narrowband region, and communicate using the first narrowband based at least in part on the first subframe availability or using the second narrowband region based at least in part on the second subframe availability.

A non-transitory computer-readable medium storing code for wireless communication is described. The code may include instructions executable to establish a communication link over a carrier comprising a first narrowband region and a second narrowband region, determine a first subframe availability for the first narrowband region and a second subframe availability for the second narrowband region, and communicate using the first narrowband based at least in part on the first subframe availability or using the second narrowband region based at least in part on the second subframe availability.

Some examples of the method, apparatuses, or non-transitory computer-readable medium described herein may further include processes, features, means, or instructions for identifying a channel configuration, and the first subframe availability and the second subframe availability are determined based at least in part on the channel configuration. Additionally or alternatively, in some examples the channel configuration is a reference signal configuration having a bandwidth less than a bandwidth of the carrier.

In some examples of the method, apparatuses, or non-transitory computer-readable medium described herein, the reference signal configuration comprises a positioning reference signal configuration, a discovery reference signal configuration, a primary synchronization signal (PSS), a secondary synchronization signal (SSS), a physical broadcast channel (PBCH), or the like. Additionally or alternatively, some examples may include processes, features, means, or instructions for determining a subsequent subframe availability for the first narrowband region based at least in part on the channel configuration.

In some examples of the method, apparatuses, or non-transitory computer-readable medium described herein, determining the first subframe availability comprises determining that a subframe is available for MTC, determining that the subframe is at least partially unavailable for MTC, or determining that a portion of the subframe is available for MTC. Additionally or alternatively, in some examples the first subframe availability is different than the second subframe availability.

Some examples of the method, apparatuses, or non-transitory computer-readable medium described herein may further include processes, features, means, or instructions for receiving an indication of subframe availability, wherein the first or second subframe availability is determined based at least in part on the received indication. Additionally or alternatively, in some examples the indication is at least one of a configuration of one or more reference signals with a bandwidth, a repetition pattern, and a periodicity, or a configuration indicating the first subframe availability separately from the second subframe availability.

In some examples of the method, apparatuses, or non-transitory computer-readable medium described herein, determining the first subframe availability comprises determining that a subframe is available for the first narrowband region based at least in part on a first reference signal and determining the second subframe availability comprises determining that the subframe is at least partially unavailable for the second narrowband region based at least in part on a second reference signal. Additionally or alternatively, in some examples the first reference signal is cell-specific and the second reference signal is UE-specific.

Some examples of the method, apparatuses, or non-transitory computer-readable medium described herein may further include processes, features, means, or instructions for determining whether a TTI bundling configuration includes a subframe based at least in part on the first subframe availability. Additionally or alternatively, in some examples the TTI bundling configuration is based at least in part on a frequency of interruptions by a channel or a reference signal for the first narrowband region.

Some examples of the method, apparatuses, or non-transitory computer-readable medium described herein may further include processes, features, means, or instructions for determining a TTI bundling configuration based at least in part on the first subframe availability. Additionally or alternatively, some examples may include processes, features, means, or instructions for identifying a frequency hopping configuration for the TTI bundling configuration based at least in part on the first subframe availability.

Some examples of the method, apparatuses, or non-transitory computer-readable medium described herein may further include processes, features, means, or instructions for determining whether scheduled traffic is unicast or broadcast, wherein the first subframe availability is determined based at least in part on whether the scheduled traffic is unicast or broadcast. Additionally or alternatively, some examples may include processes, features, means, or instructions for determining that the scheduled traffic is broadcast traffic, wherein determining the first subframe availability comprises determining that a subframe is available for MTC based at least in part on the broadcast traffic, and rate-matching the scheduled traffic based at least in part on the broadcast traffic.

Some examples of the method, apparatuses, or non-transitory computer-readable medium described herein may further include processes, features, means, or instructions for determining that the scheduled traffic is unicast traffic, wherein determining the first subframe availability comprises determining that a subframe is at least partially unavailable for MTC based at least in part on the unicast traffic. Some examples may include determining that additional traffic is unicast traffic, wherein determining the first subframe availability comprises determining that the subframe is available for narrowband communications based at least in part on a determination that the subframe is at least partially unavailable for broadcast traffic. Some examples may include determining that the scheduled traffic is broadcast traffic, wherein determining the first subframe availability comprises determining that a subframe is at least partially unavailable for narrowband communications based at least in part on the broadcast traffic. Some examples may include determining that a system bandwidth is less than a threshold, wherein determining the first subframe availability comprises determining that a subframe is at least partially unavailable for paging traffic based at least in part on determining that the system bandwidth is less than the threshold. Additionally or alternatively, some examples may include processes, features, means, or instructions for determining a frequency hopping configuration based at least in part on determining whether the scheduled traffic is unicast or broadcast.

BRIEF DESCRIPTION OF THE DRAWINGS

Aspects of the disclosure are described in reference to the following figures.

DETAILED DESCRIPTION

Figure 1:
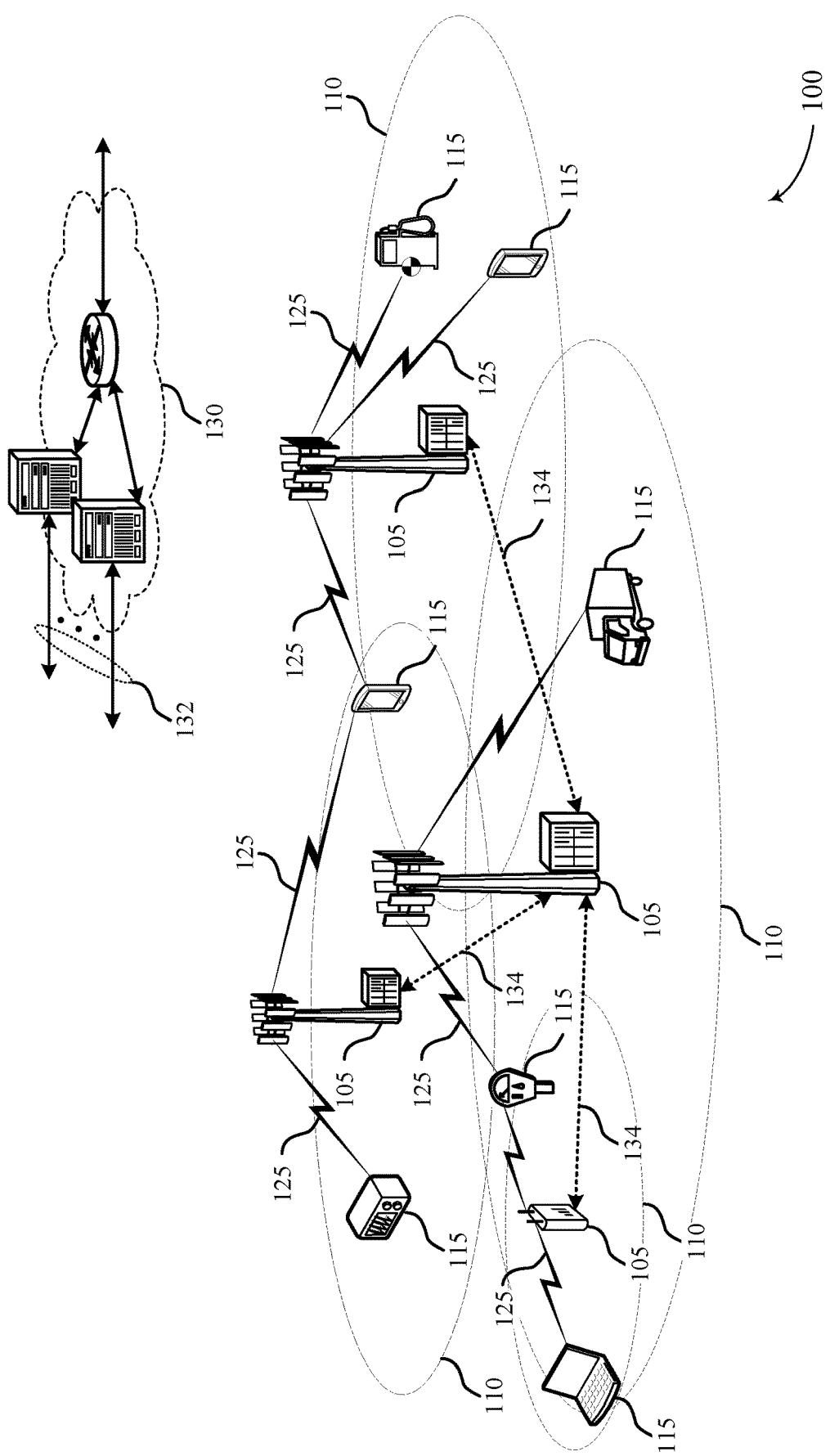
FIG. 1 illustrates an example of a wireless communications system that supports narrowband dependent subframe availability determination in accordance with various aspects of the present disclosure.

Some wireless systems may provide service for a category of low-cost or low-complexity user equipment (UE) known as machine-type-communication (MTC) devices. These devices may communicate with certain restrictions, which may be based on physical limitations, and which may include lower data rates, limited transport block size, half duplex operation, or relaxed switching time. Low-cost or low-complexity devices may also be provided or supported with coverage enhancements, and may be configured to operate within a narrowband region of a wideband carrier. In some cases, the carrier may be divided into multiple narrowband regions serving different devices. Other UEs capable of operating on a wideband may nonetheless also be configured to operate in a narrowband region of a wideband carrier.

Some signals transmitted by a base station and intended for use by a variety of devices may cover or occupy a subrange or subband of a carrier. These signals may impact the scheduling of various narrowband regions differently, depending on how much overlap there is between the signals and the narrowband region. As an example, a base station may transmit positioning reference signals (PRS) with a configurable bandwidth. If the PRS bandwidth is less than the cell's bandwidth, the PRS may be located in the central portion of the band. Discovery reference signals (DRS) may be another example of signals covering a portion of a cell's bandwidth. The availability of a subframe (e.g, availability for machine-type communication (MTC)) may therefore depend on the configuration of one or more channels or signals in the subframe In some cases, all the RBs in a subframe may unavailable for narrowband communication (e.g., MTC) based on a channel configuration. In other cases, some or all of RBs may be available for narrowband communication. If a carrier is divided into different narrowband regions, each region may have a different availability in a particular subframe— e.g., no resource blocks (RBs), some RBs, some resources in one or more RBs, or all RBs may be available for narrowband communication. Due to subframe dependent presence of signaling, such as PRS of DRS, the availability of a narrowband region may change over time; for example, a narrowband region may be unavailable during one subframe and may be available in a subsequent or preceding subframe.

Given that different regions may have different subframe availability, the usage of different regions may also be different. For example, if MTC is subject to coverage enhancement, and consequently utilizes subframe (TTI) bundling, it may be preferable to define TTI bundling operation in a set of regions that have more subframe availability. If region (e.g., frequency) hopping is supported for a bundled transmission, the set of regions utilized for hopping can be a subset of the available regions with relatively more subframe availability.

It may also be possible to perform resource availability decisions for narrowband regions differently for broadcast traffic as compared to unicast traffic. For broadcast traffic, in a subframe where the narrowband channels or signals are present, rate matching can be performed, even if a narrowband for MTC partially collides with the channels or signals. For MTC unicast traffic, a narrowband may, for instance, be skipped entirely if the narrowband collides with the channels or signals even partially. In some cases, TTI bundling size may be defined irrespective of subframe availability for sparse channels or signals.

Aspects of the disclosure are initially described below in the context of a wireless communication system. Specific examples are then described for an example bandwidth structure. These and other aspects of the disclosure are further illustrated by and described with reference to apparatus diagrams, system diagrams, and flowcharts that relate to narrowband dependent subframe availability and utilization.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network. Wireless communications system 100 may be an example of a system in which subframe availability and utilization for narrowband communication may depend on the configuration of reference signals and other channels.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may be, for example, a cellular phone, a wireless modem, a handheld device, a personal computer, a tablet, a personal electronic device, or the like.

Some of the UEs 115 may be MTC devices, which may provide for automated communication and may include those implementing Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. UEs 115 that are MTC devices may include those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

LTE systems, which wireless communication system may represent in some cases, may utilize orthogonal frequency division multiple access (OFDMA) on the downlink (DL) and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be, for example, 1, 2, 4, 8 or 16 sub-bands.

A frame structure may be used to organize the physical resources of a carrier. Time intervals in LTE may be expressed in multiples of a basic time unit (e.g., the sampling period, Ts=1/30,720,000 seconds), and may be organized according to radio frames of length of 10 ms (Tf=307200·Ts), which may be identified by a system frame number (SFN) ranging from 0 to 1023. A frame may be further divided into 10 equally sized sub-frames. Each sub-frame may include two consecutive time slots. Each slot may include 6 or 7 OFDMA symbol periods. A resource element consists of one symbol period and one subcarrier (a 15 KHz frequency range).

A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signals (CRS) and a UE-specific RS (UE-RS), which may also be referred to as a demodulation reference signal (DM-RS). UE-RS may be transmitted on the resource blocks associated with a physical downlink shared channel (PDSCH). The number of bits carried by each resource element may depend on the modulation scheme, e.g., the configuration of symbols that may be selected during each symbol period. Thus, the more resource blocks that a UE receives and the higher the modulation scheme, the higher the data rate may be. In some cases, the subframe may be the smallest scheduling unit, and may be referred to as a transmission time interval (TTI). In other cases, a TTI may be shorter than a subframe or may be dynamically selected (e.g., in short TTI bursts or in selected component carriers using short TTIs), or both.

Certain time and frequency resources of a cell may be used for the transmission of one or more reference signals, including CRS or UE-RS, or may be used for transmitting synchronization signals, or both. For example, a UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS, or vice versa. Both the PSS and the SSS may be located in the central 62 and 72 subcarriers of a carrier, respectively.

As another example, a base station may transmit positioning reference signals (PRS) with a configurable bandwidth (e.g., 1.4/3/5/10/15/20 MHz). Thus, a cell may cover 10 MHz, but the PRS may utilize only 5 MHz. If the PRS bandwidth is less than the cell's bandwidth, the PRS may be located in the central portion of the band. In some cases, a PRS may be transmitted periodically (e.g., with periodicities configurable to 160 ms/320 ms/640 ms or 1280 ms), and each transmission occasion may have a configurable span of consecutive downlink subframes (e.g., 1/2/4/6). Discovery reference signals (DRS) may be another example of signals covering a portion of a cell's bandwidth. DRS bandwidth may also be configurable (e.g., 1.4/3/5/10/15/20 MHz), and may be periodically or sporadically transmitted. In some cases, the availability of a subframe for use by UEs 115, such as low-cost or low-complexity MTC devices, may depend on the presence of PRS, DRS, or other reference signals.

A base station 105 may also insert periodic pilot symbols, such as CRS mentioned above, to aid UEs 115 in channel estimation and coherent demodulation. CRS may include one of 504 different cell identities, for example. CRS transmissions may be modulated using QPSK and power boosted (e.g., transmitted at 6 dB higher than the surrounding data elements) to make them resilient to noise and interference. CRS may, for example, be embedded in 4 to 16 resource elements in each resource block based on the number of antenna ports or layers (up to 4) of the receiving UEs 115. In addition to CRS, which may be utilized by all UEs 115 in the geographic coverage area 110 of the base station 105, demodulation UE-RS (or DM-RS), discussed above, may be directed toward specific UEs 115 and may be transmitted only on resource blocks assigned to those UEs 115.

In some cases, wireless communication system 100 may utilize coverage enhancement (CE) techniques to improve the quality of a communication link 125 for UEs 115 located at a cell edge, operating with low power transceivers, or experiencing high interference or path loss. CE techniques may include repeated transmissions, TTI bundling, HARQ retransmission, PUSCH hopping, beamforming, power boosting, or other techniques. The CE techniques used may depend on the specific needs of UEs 115 in different circumstances. For example, TTI bundling may involve sending multiple copies of the same information in a group of consecutive or non-consecutive TTIs, rather than waiting for a negative acknowledgement (NACK), before retransmitting redundancy versions. This may be effective for users engaging in voice over Long Term evolution (VoLTE) or VOIP communications. In other cases, the number of HARQ retransmissions may also be increased. Uplink data transmissions may be transmitted using frequency hopping to achieve frequency diversity. Beamforming may be used to increase the strength of a signal in a particular direction, or the transmission power may simply be increased. In some cases, one or more CE options may be combined and CE levels may be defined based on a number of decibels the techniques are expected to improve a signal (e.g., no CE, 5 dB CE, 10 dB CE, 15 dB CE, etc.).

In some cases, wireless communications system 100 may utilize enhanced component carriers (eCCs). An eCC may be characterized by features including flexible bandwidth, different TTIs, and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more narrowband regions that may be utilized by UEs 115, such as low-cost or low-complexity MTC devices mentioned above, that may not be capable of monitoring the whole bandwidth or prefer to use a limited bandwidth (e.g., to conserve power).

In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Thus, a UE 115 and a base station 105 may establish a communication link over a carrier that includes multiple narrowband regions. The base station 105 or UE 115, or both may determine a subframe availability associated with each of the regions, and base station 105 and UE 115 may communicate on one or more of the regions based on the availability. In some cases, the availability may depend on a channel configuration, such as the presence of reference signals (e.g., PRS, DRS or other signals) covering a portion of the overall bandwidth of the carrier. In some cases, TTI bundling or frequency hopping may depend on the subframe availability.

Figure 2:
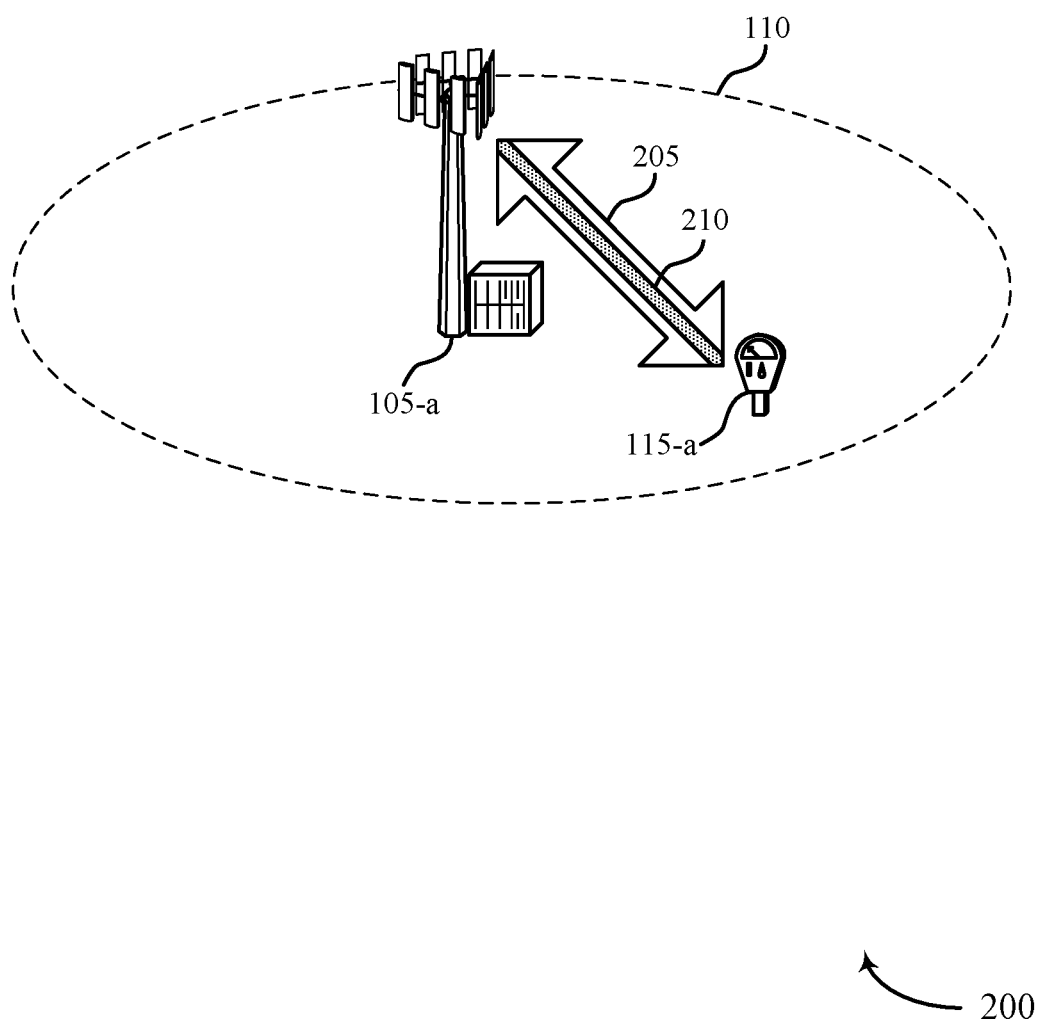
FIG. 2 illustrates an example of a wireless communications system that supports narrowband dependent subframe availability determination in accordance with various aspects of the present disclosure.

FIG. 2 illustrates an example of a wireless communications system 200 for narrowband dependent subframe availability determination in accordance with various aspects of the present disclosure. Wireless communications system 200 may include UE 115-a and base station 105-a, which may be examples of a UE 115 and base station 105 described with reference to FIG. 1. In some cases, UE 115-a may be a low-cost or low-complexity MTC device. In some cases, carrier 205 may be divided into multiple narrowband regions serving different devices, and UE 115-a may operate in a narrowband region 210 (e.g., a 1.4 MHz region) within the frequency range of carrier 205 (e.g., a 3, 5, 10, 15, or 20 MHz band). In some examples, UE 115-a may operate according to coverage enhancements that may be provided in different levels (e.g., 5 dB, 10 dB, or 15 dB).

Some signals transmitted by base station 105-a may also cover a subrange of a carrier. These signals may impact the scheduling of different narrowband regions differently based on how much overlap there is between the signals and the narrowband region. So, in some cases, the availability of a subframe (e.g., availability for narrowband communication) may depend on the configuration of one or more channels or signals in the subframe. In some cases, all the RBs in the subframe may unavailable for narrowband communication (e.g., MTC) based on the configuration. In other cases, some or all of RBs may be available for narrowband communication. If a carrier is divided into different narrowband regions, each region may have a different availability (e.g., no resource blocks (RBs), some RBs, some resources in one or more RBs, or all RBs). Due to subframe dependent presence of signaling, such as PRS of DRS, the availability of a narrowband region may change over time. In some examples, a particular subframe of a narrowband region may be either wholly available, or wholly unavailable (i.e., either no RBs or all RBs are made available); for example, if there is at least one RB at least partially unavailable for MTC in the narrowband, the entire region may be assumed unavailable.

Alternatively, even if a channel or signal does not occupy the entire system bandwidth of carrier 205, each region may be made unavailable for communication within a particular narrowband. As another example, for PRS (or other cell-specific signals), subframe availability can be region dependent, but for DRS (or other UE-specific signals), subframe availability can be independent of the region. (e.g., all regions may be unavailable in a DRS subframe). The determination of subframe availability may be based on implicit or explicit signaling. As an example of implicit signaling, UE 115-a may receive a PRS configuration (either unicast or broadcast), determine whether a region in a subframe overlaps with the PRS or not, and then determine whether the region in the subframe is available for communication (e.g., MTC).

As an example of explicit signaling, UE 115-a may receive (e.g., on a per region basis), a set of subframes that are available for MTC operation. Different regions may be signaled different subframe availability. The granularity can be based on region, RB, or a fraction of an RB. Granularity based on individual RBs or fractions of RBs may be more flexible, but may include higher overhead.

Given that different regions may have different subframe availability, the usage of different regions may also be different. For example, if MTC or an MTC device (e.g., UE 115-a) is subject to coverage enhancement, and consequently requires subframe (i.e., TTI) bundling, it may be preferable to define TTI bundling operation in a set of regions which have more subframe availability. If region hopping is supported for a bundled transmission, the set of regions can be a subset of the available regions with relatively more subframe availability.

It may also be possible to perform resource availability decisions for narrowband regions differently for broadcast traffic as compared to unicast traffic. For broadcast traffic, in a subframe where the narrowband channels or signals are present, rate matching can be performed for these signals when transmitting the broadcast traffic, even if a particular narrowband partially collides with the channels or signals. For unicast traffic, narrowband regions can, in some examples, be skipped entirely if the narrowband collides with the channels or signals even partially. For example, if resource hopping across narrowband regions is defined for broadcast, the regions may all be included regardless of collision with other channels or signals. For unicast, the hopping may be defined, in some instances, exclusively for the regions without resource collisions.

Thus, in some cases scheduled traffic is broadcast traffic, and a subframe is at least partially unavailable for narrowband (e.g., MTC) broadcast (i.e., paging, RACH, or SIB traffic). However, narrowband unicast traffic may be available if the narrowband broadcast traffic is at least partially unavailable. In some case, if a bandwidth is less than a threshold (e.g., 3 MHz), one or more central bands may not be used for broadcast (e.g., paging) traffic. So a determination may be made that a subframe is at least partially unavailable for paging traffic based on a determination that the system bandwidth is less than the threshold.

It may, in some cases, be preferable to define TTI bundling size irrespective of subframe availability for sparse channels or signals. However, the TTI bundling definition may exclude subframes which are impacted by relatively densely scheduled channels or signals (such as eMBMS subframes). For example, assuming a TTI bundling size of 8 subframes in a FDD system, the bundling may also include PRS/DRS subframes, which may be sparse, even if these subframes may not be available for communication (e.g., MTC) in some narrowband regions. However, the bundling may exclude eMBMS subframes (which may be more densely scheduled).

Figure 3:
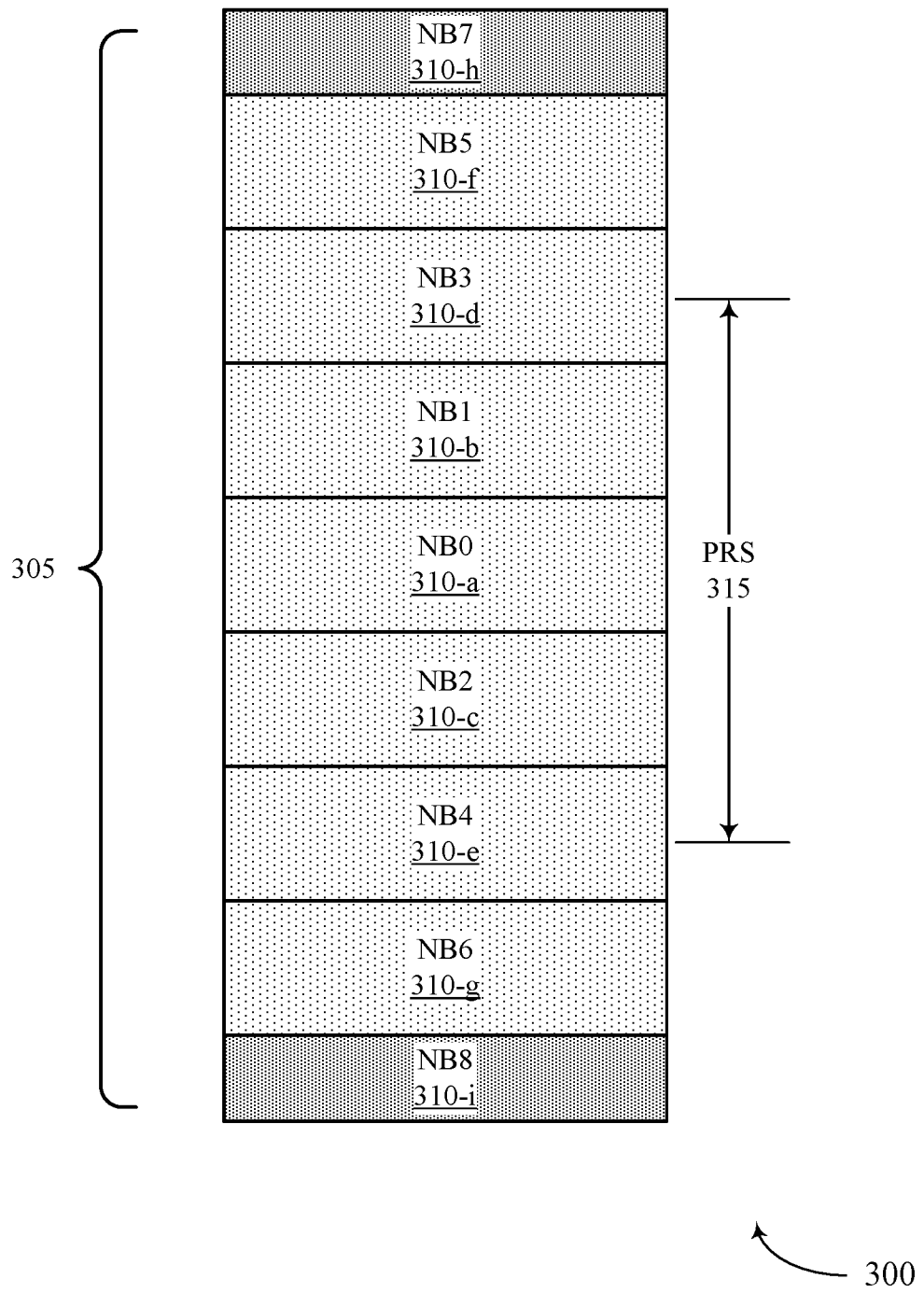
FIG. 3 illustrates an example of a bandwidth structure that supports narrowband dependent subframe availability determination in accordance with various aspects of the present disclosure.

FIG. 3 illustrates an example of a bandwidth structure 300 for narrowband dependent subframe availability determination in accordance with various aspects of the present disclosure. Bandwidth structure 300 may be utilized by a UE 115 and a base station 105 as described with reference to FIGS. 1-2. Bandwidth structure 300 may illustrate an example of a cell having a total bandwidth 305 of 10 MHz (which may include 50 RBs) and a PRS covering a bandwidth portion 315 covering 25 RBs. Other example with different bandwidths may also be possible.

The total bandwidth 305 may include nine narrowband regions 310. In some cases, the narrowband regions may be of different sizes. For example, narrowband regions 310-a through 310-g may include 6 RBs and narrowband regions 310-h and 310-i may include 4 RBs. The PRS configured for bandwidth portion 315 may overlap with some regions (e.g., with narrowband regions 310-a through 310-c) completely, and may overlap partially with other (e.g., with narrowband regions 310-d and 310-e).

Scheduling for MTC devices or other devices may depend on the bandwidth portion 315 used for a signal or channel (such as the PRS). For example, the total bandwidth 305 may be unavailable during PRS subframes (or subframes used for other signals), some RBs may be unavailable (e.g., the RBs used for the signaling even in partially covered narrowband regions 310), or some narrowband regions 310 may be unavailable (e.g., those at least partially covered by bandwidth portion 315). In some examples, large TTI bundling may be preferably performed for narrowband regions 310-f through 310-i, while no or limited TTI bundling may be preferably performed for narrowband regions 310-a through 310-e. In some cases, a device may only perform region hopping within specific regions such as narrowband regions 310-f through 310-i. In another example, if a UE 115 is indicated that, e.g., narrowband regions 310-d and 310-e are for eMBMS every frame, the bundling of size 8 can skip subframes those regions. In yet another example, a bundling size of 8 subframes would include narrowband regions except 310-d and 310-e.

Figure 4:
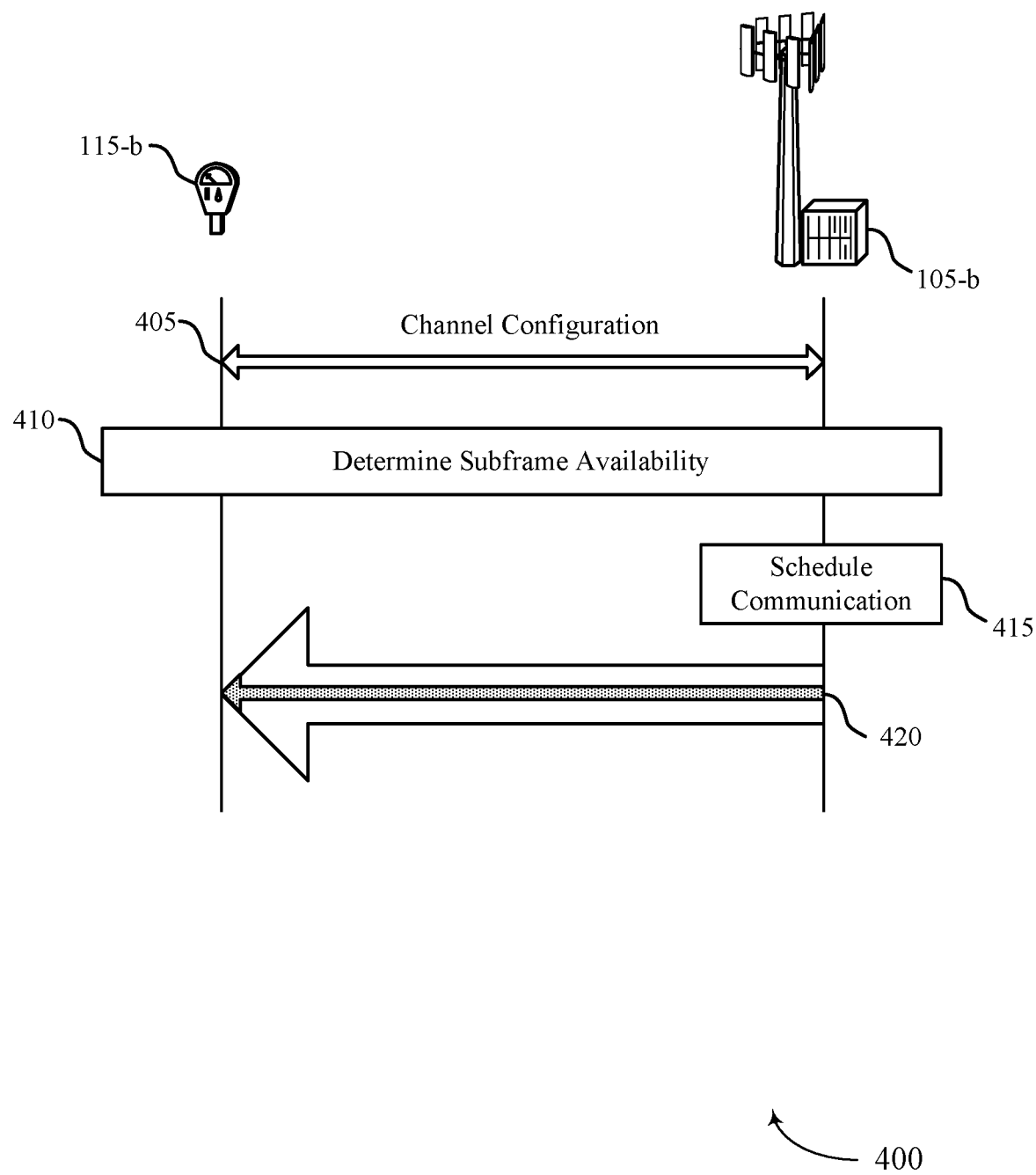
FIG. 4 illustrates an example of a process flow in a system that supports narrowband dependent subframe availability determination in accordance with various aspects of the present disclosure.

FIG. 4 illustrates an example of a process flow 400 in a system that supports narrowband dependent subframe availability determination in accordance with various aspects of the present disclosure. Process flow 400 may include UE 115-b and base station 105-b, which may be examples of a UE 115 and base station 105 described with reference to FIGS. 1-2.

At 405, UE 115-b and base station 105-b may establish a communication link over a carrier, which may include multiple narrowband regions. UE 115-b and base station 105-b may, for instance, establish a communication link over a carrier with a first narrowband region and a second narrowband region.

In some cases, UE 115-b and base station 105-b may identify a channel configuration. A first subframe availability and a second subframe availability may be determined based on the channel configuration. In some examples, the channel configuration may be or be associated with a reference signal configuration having a bandwidth less than a bandwidth of the carrier. In some examples, the reference signal configuration includes a positioning reference signal configuration, a discovery reference signal configuration, a primary synchronization signal (PSS) configuration, a secondary synchronization signal (SSS) configuration, a physical broadcast channel (PBCH) configuration, or any combination thereof.

At 410, UE 115-b and base station 105-b may determine a subframe availability for one or more narrowband regions of the carrier. For example, UE 115-b and base station 105-b may determine a first subframe availability for the first narrowband region and a second subframe availability for the second narrowband region. In some examples, determining the first subframe availability includes determining that a subframe is available for communication (e.g., MTC), determining that the subframe is at least partially unavailable for communication (e.g., MTC), or determining that a portion of the subframe is available for communication (e.g., MTC). In some examples, the first subframe availability is different from the second subframe availability.

UE 115-b and base station 105-b may receive an indication of subframe availability, such that the first or second subframe availability may be determined based on the received indication. In some examples, the indication is a configuration of reference signals with a bandwidth, a repetition pattern, and a periodicity; alternatively, the indication may be a configuration indicating the first subframe availability separately from the second subframe availability. In some examples, determining the first subframe availability includes determining that a subframe is available for the first narrowband region based on a first reference signal, and determining the second subframe availability includes determining that the subframe is at least partially unavailable for the second narrowband region based on a second reference signal. In some examples, the first reference signal is cell-specific (e.g., CRS) and the second reference signal is UE-specific (e.g., UE-RS).

UE 115-b or base station 105-b, or both, may determine whether scheduled traffic is unicast or broadcast; and the first subframe availability may be determined based on whether the scheduled traffic is unicast or broadcast. UE 115-b and base station 105-b may determine that the scheduled traffic is broadcast traffic, such that determining the first subframe availability may include determining that a subframe is available for communication based on the broadcast traffic. In some cases, UE 115-b and base station 105-b may determine that the scheduled traffic is unicast traffic, and determining the first subframe availability may include determining that a subframe is at least partially unavailable for MTC based on the unicast traffic.

At 415, base station 105-b may schedule a transmission based on the subframe availability. UE 115-b or base station 105-b, or both, may rate-match the scheduled traffic based on the broadcast traffic. At 420, base station 105-b may transmit (and UE 115-b may receive) information based on the subframe availability. UE 115-b and base station 105-b may communicate using the first narrowband region based on the first subframe availability or using the second narrowband region based on the second subframe availability.

In some cases, UE 115-b and base station 105-b may determine a subsequent subframe availability for the first narrowband region based on the channel configuration. In some cases, UE 115-b and base station 105-b may determine whether a TTI bundling configuration includes a subframe based on the first subframe availability. In some examples, the TTI bundling configuration is based on a frequency of interruptions by a channel or a reference signal for the first narrowband region. In some cases, UE 115-*b* and base station 105-*b* may determine a TTI bundling configuration based on the first subframe availability. In some cases, UE 115-*b* and base station 105-*b* may identify a frequency hopping configuration for the TTI bundling configuration based on the first subframe availability. In some cases, UE 115-*b* and base station 105-*b* may determine a frequency hopping configuration based on determining whether the scheduled traffic is unicast or broadcast.

Figure 5:
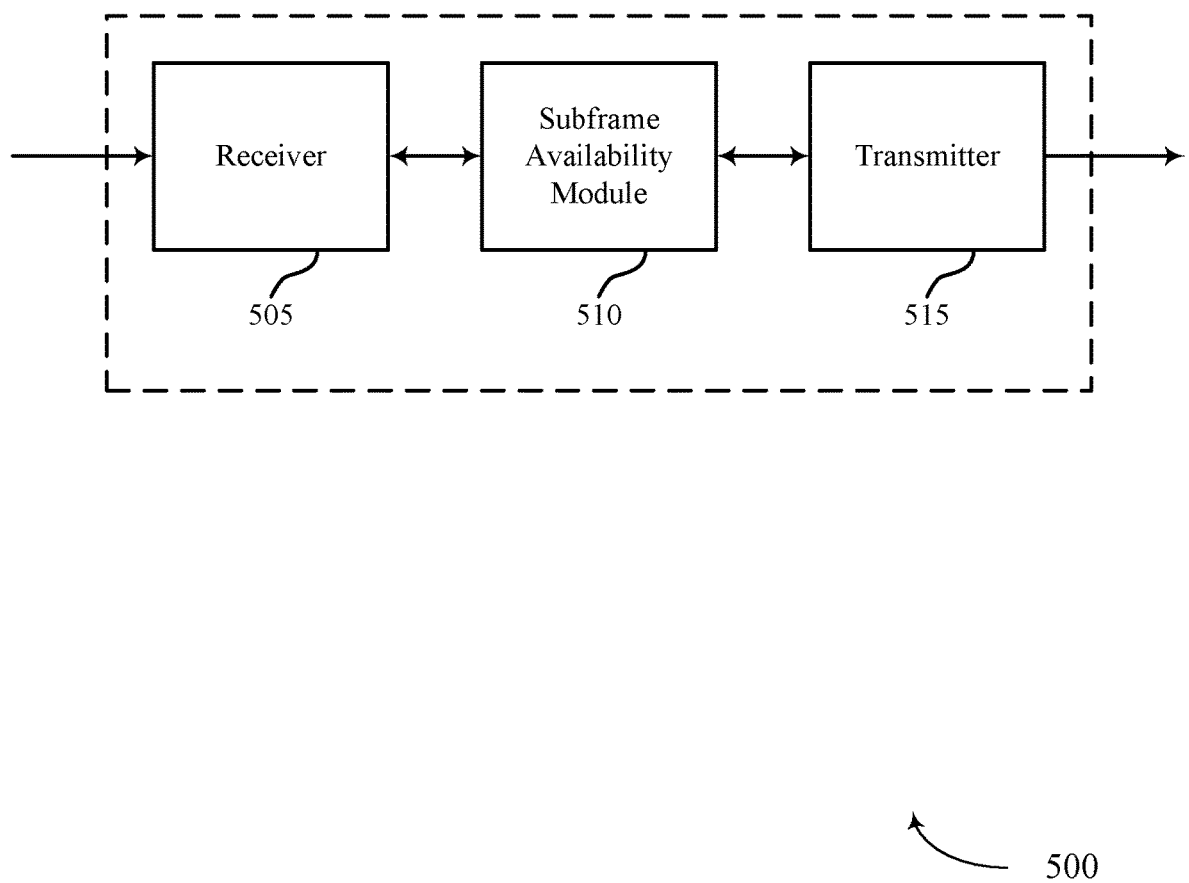
FIGS. 5-7 show block diagrams of a wireless device or devices that support narrowband dependent subframe availability determination in accordance with various aspects of the present disclosure.

FIG. 5 shows a block diagram of a wireless device 500 that supports narrowband dependent subframe availability determination in accordance with various aspects of the present disclosure. Wireless device 500 may be an example of aspects of a UE 115 described with reference to FIGS. 1-4. Wireless device 500 may include a receiver 505, a subframe availability module 510, or a transmitter 515. Wireless device 500 may also include a processor. Each of these components may be in communication with one another.

The receiver 505 may receive information such as packets, user data, or control information associated with various information channels (e.g., control channels, data channels, and information related to narrowband dependent subframe availability for MTC, etc.). Information may be passed on to the subframe availability module 510, and to other components of wireless device 500. In some examples, the receiver 505 may receive an indication of subframe availability, such that the first or second subframe availability may be determined based on the received indication. In some examples, the indication includes a configuration of reference signals with a bandwidth, a repetition pattern, and a periodicity, or a configuration indicating the first subframe availability separately from the second subframe availability, or both.

The subframe availability module 510 may establish a communication link over a carrier, including a first narrowband region and a second narrowband region, determine a first subframe availability for the first narrowband region and a second subframe availability for the second narrowband region, and communicate using the first narrowband region based on the first subframe availability or using the second narrowband region based on the second subframe availability.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
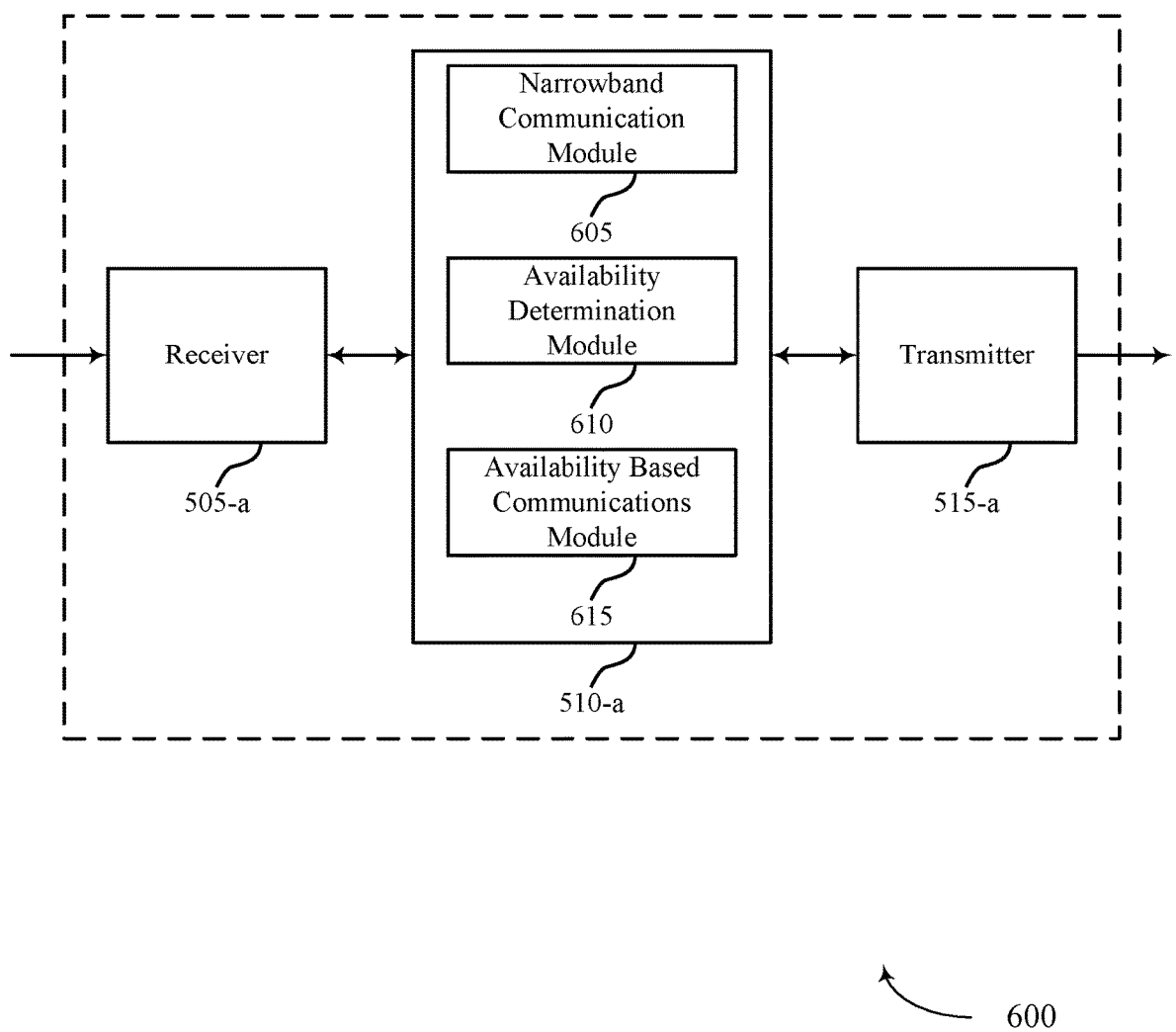

FIG. 6 shows a block diagram of a wireless device 600 that supports narrowband dependent subframe availability determination in accordance with various aspects of the present disclosure. Wireless device 600 may be an example of aspects of a wireless device 500 or a UE 115 described with reference to FIGS. 1-5. Wireless device 600 may include a receiver 505-*a*, a subframe availability module 510-*a*, or a transmitter 515-*a*. Wireless device 600 may also include a processor. Each of these components may be in communication with one another. The subframe availability module 510-*a* may also include a narrowband communication module 605, an availability determination module 610, and an availability based communications module 615.

The receiver 505-*a* may receive information which may be passed on to subframe availability module 510-*a*, and to other components of wireless device 600. The subframe availability module 510-*a* may perform the operations described with reference to FIG. 5. The transmitter 515-*a* may transmit signals received from other components of wireless device 600.

The narrowband communication module 605 may establish a communication link over a carrier including a first narrowband region and a second narrowband region as described with reference to FIGS. 2-4.

The availability determination module 610 may determine a first subframe availability for the first narrowband region and a second subframe availability for the second narrowband region as described with reference to FIGS. 2-4. The availability determination module 610 may also determine a subsequent subframe availability for the first narrowband region based on the channel configuration. In some examples, determining the first subframe availability includes determining that a subframe may be available for MTC, determining that the subframe may be at least partially unavailable for MTC, or determining that a portion of the subframe may be available for MTC.

In some examples, the first subframe availability may be different from the second subframe availability. Determining the first subframe availability may thus include determining that a subframe is available for the first narrowband region based on a first reference signal, and determining the second subframe availability may include determining that the subframe is at least partially unavailable for the second narrowband region based on a second reference signal. In some examples, the first reference signal may be a CRS and the second reference signal may be UE-RS.

The availability based communications module 615 may communicate using the first narrowband region based on the first subframe availability or using the second narrowband region based on the second subframe availability as described with reference to FIGS. 2-4.

Figure 7:
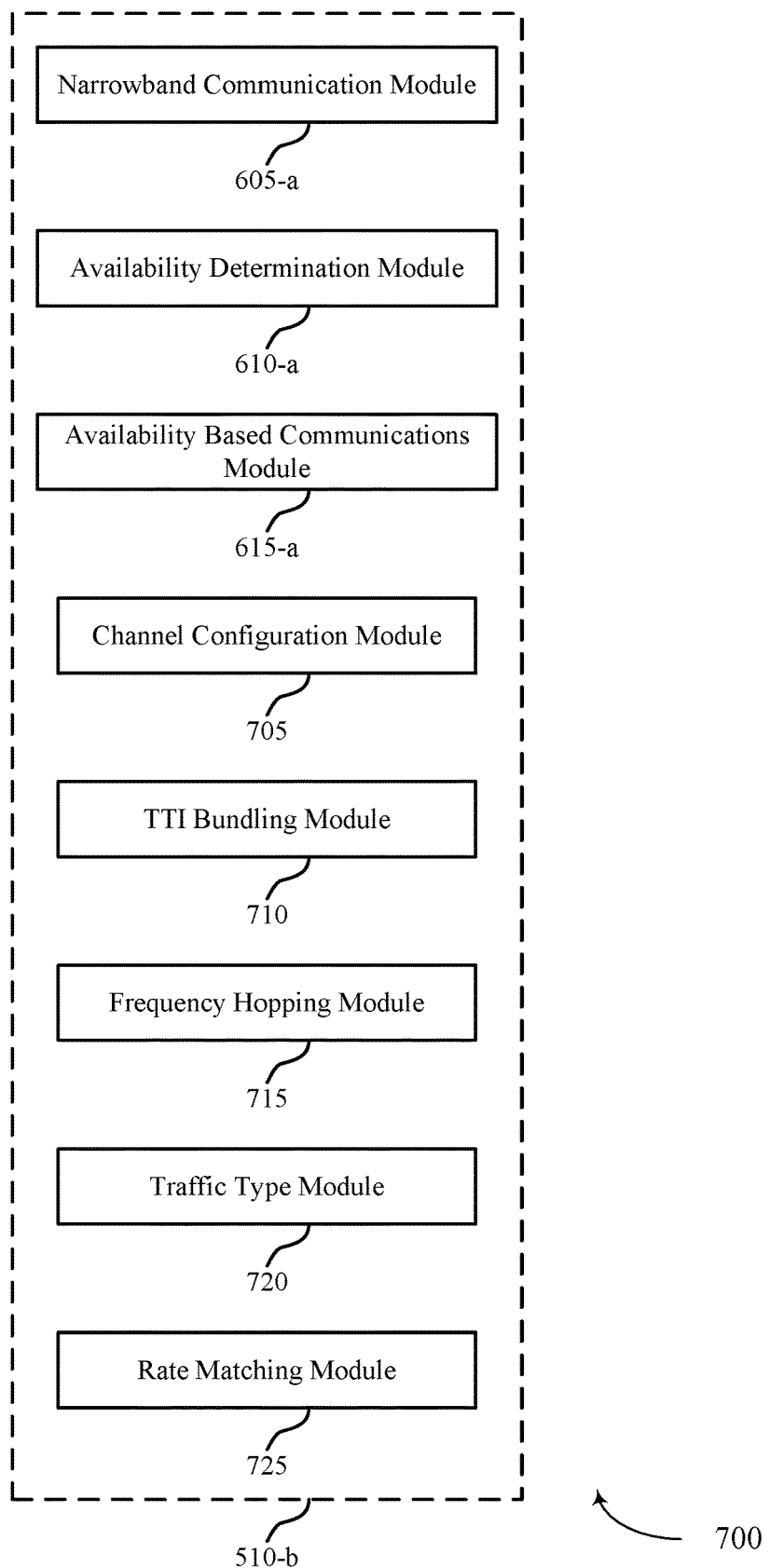

FIG. 7 shows a block diagram 700 of a subframe availability module 510-*b* which may be a component of a wireless device 500 or a wireless device 600, and with may support narrowband dependent subframe availability determination in accordance with various aspects of the present disclosure. The subframe availability module 510-*b* may be an example of aspects of a subframe availability module 510 described with reference to FIGS. 5-6. The subframe availability module 510-*b* may include a narrowband communication module 605-*a*, an availability determination module 610-*a*, and an availability based communications module 615-*a*. Each of these modules may perform the functions described with reference to FIG. 6. The subframe availability module 510-*b* may also include a channel configuration module 705, a TTI bundling module 710, a frequency hopping module 715, a traffic type module 720, and a rate matching module 725.

The channel configuration module 705 may identify a channel configuration as described with reference to FIGS. 2-4. In some examples, the first subframe availability and the second subframe availability are determined based on the channel configuration. In some examples, the channel configuration may be a reference signal configuration having a bandwidth less than a bandwidth of the carrier. In some examples, the reference signal configuration includes a positioning reference signal configuration, a discovery reference signal configuration, a primary synchronization signal (PSS) configuration, a secondary synchronization signal (SSS) configuration, a physical broadcast channel (PBCH) configuration, or any combination thereof.

The TTI bundling module 710 may determine whether a TTI bundling configuration includes a subframe based on the first subframe availability as described with reference to FIGS. 2-4. In some examples, the TTI bundling configuration may be based on a frequency of interruptions by a channel or a reference signal for the first narrowband region. The TTI bundling module 710 may also determine a TTI bundling configuration based on the first subframe availability.

The frequency hopping module 715 may identify a frequency hopping configuration for the TTI bundling configuration based part on the first subframe availability as described with reference to FIGS. 2-4. The frequency hopping module 715 may also determine a frequency hopping configuration based on determining whether the scheduled traffic is unicast or broadcast.

The traffic type module 720 may determine whether scheduled traffic is unicast or broadcast, such that the first subframe availability may be determined based on whether the scheduled traffic is unicast or broadcast as described with reference to FIGS. 2-4. The traffic type module 720 may also determine that the scheduled traffic is broadcast traffic, such that determining the first subframe availability may include determining that a subframe is available for communication (e.g., MTC) based on the broadcast traffic. The traffic type module 720 may also determine that the scheduled traffic is unicast traffic, such that determining the first subframe availability may include determining that a subframe is at least partially unavailable based on the unicast traffic.

The rate matching module 725 may rate-match the scheduled traffic based on the broadcast traffic as described with reference to FIGS. 2-4.

Figure 8:
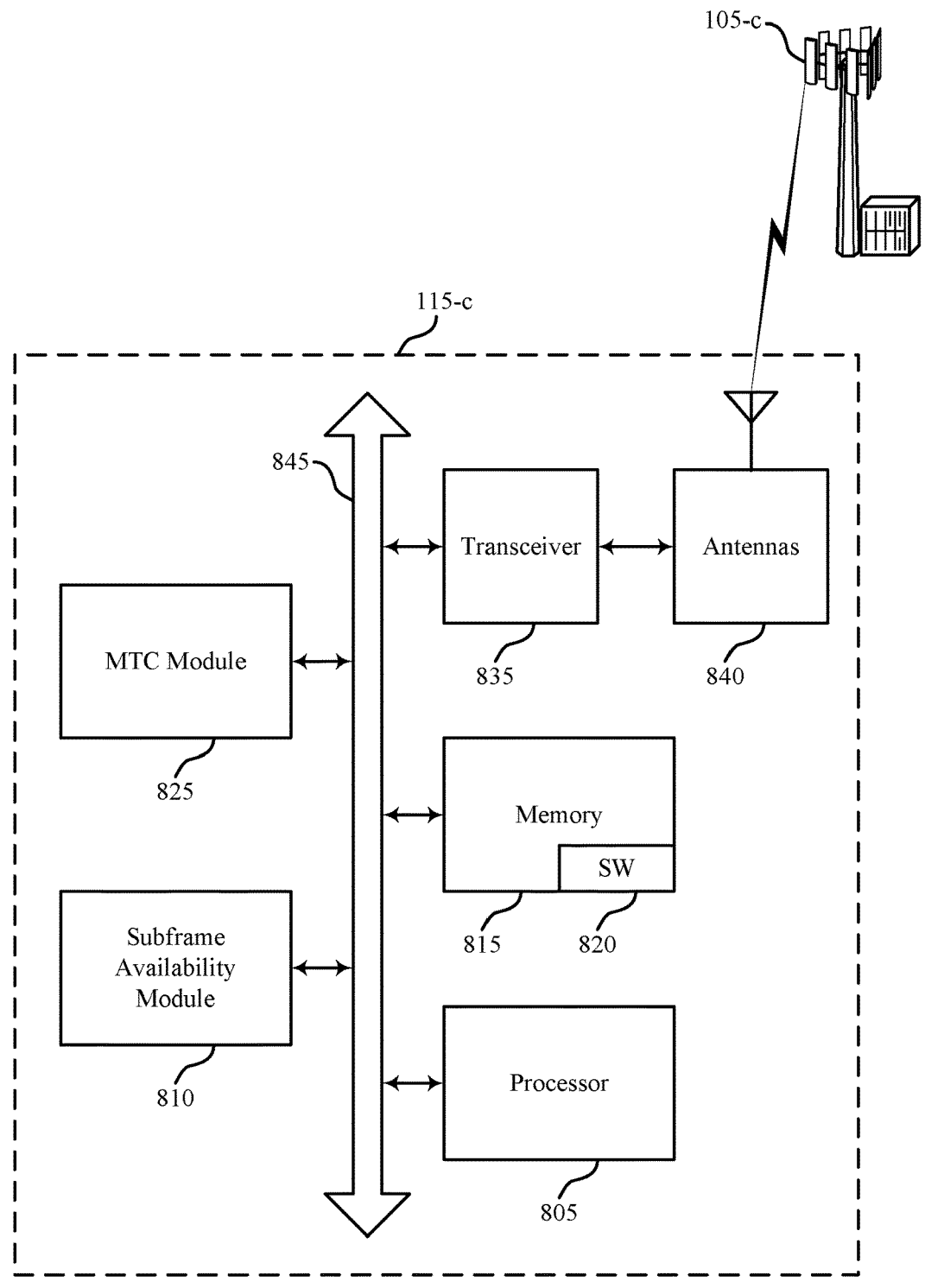
FIG. 8 illustrates a block diagram of a system, including a device that supports narrowband dependent subframe availability determination in accordance with various aspects of the present disclosure.

FIG. 8 shows a diagram of a system 800, including a UE that supports narrowband dependent subframe availability determination in accordance with various aspects of the present disclosure. System 800 may include UE 115-c, which may be an example of a wireless device 500, a wireless device 600, or a UE 115 described with reference to FIGS. 1, 2, and 4-7. UE 115-c may include a subframe availability module 810, which may be an example of a subframe availability module 510 described with reference to FIGS. 5-7. UE 115-c may also include an MTC module 825. UE 115-c may also include components for bi-directional voice and data communications including components for transmitting communications and components for receiving communications. For example, UE 115-c may communicate bi-directionally with base station 105-c.

MTC module 825 may enable UE 115-c to communicate using MTC specific procedures as described with reference to FIG. 1. For example, MTC module 825 may enable coverage enhancement procedures or narrowband operation.

UE 115-c may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-c may include a single antenna 840, UE 115-c may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., narrowband dependent subframe availability for MTC, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
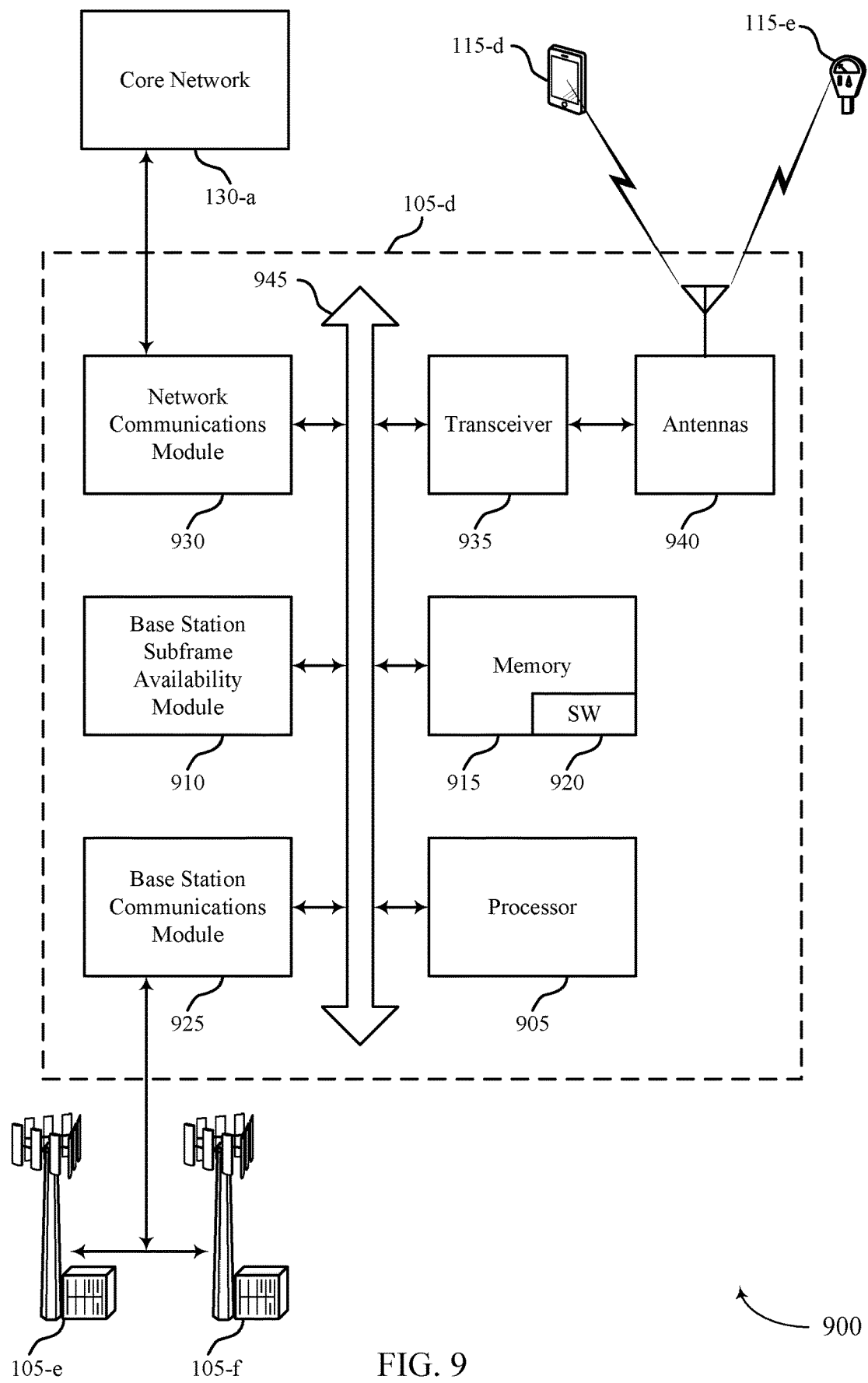
FIG. 9 illustrates a block diagram of a system, including a base station that supports narrowband dependent subframe availability determination in accordance with various aspects of the present disclosure.

FIG. 9 shows a diagram of a system 900 including, a base station that supports narrowband dependent subframe availability determination in accordance with various aspects of the present disclosure. System 900 may include base station 105-d, which may be an example of a wireless device 500, a wireless device 600, or a base station 105 described with reference to FIGS. 1, 2, and 4-8. Base Station 105-d may include a base station subframe availability module 910, which may be an example of a base station subframe availability module 910 described with reference to FIGS. 5-7. Base Station 105-d may also include components for bi-directional voice and data communications including components for transmitting communications and components for receiving communications. For example, base station 105-d may communicate bi-directionally with UE 115-d or UE 115-e.

In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-e or 105-f utilizing base station communication module 925. In some examples, base station communication module 925 may provide an X2 interface within an LTE/LTE-A wireless communication network technology to provide communication between some of the base stations 105. In some examples, base station 105-d may communicate with other base stations through core network 130. In some cases, base station 105-d may communicate with the core network 130 through network communications module 930.

The base station 105-d may include a processor 905, memory 915 (including software (SW) 920), transceiver 935, and antenna(s) 940, which each may be in communication, directly or indirectly, with one another (e.g., over bus system 945). The transceivers 935 may be configured to communicate bi-directionally, via the antenna(s) 940, with the UEs 115, which may be multi-mode devices. The transceiver 935 (or other components of the base station 105-d) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-d may include multiple transceivers 935, each with one or more associated antennas 940. The transceiver may be an example of a combined receiver 505 and transmitter 515 of FIG. 5.

The memory 915 may include RAM and ROM. The memory 915 may also store computer-readable, computer-executable software code 920 containing instructions that are configured to, when executed, cause the processor 905 to perform various functions described herein (e.g., narrowband dependent subframe availability for MTC, selecting coverage enhancement techniques, call processing, database management, message routing, etc.). Alternatively, the software code 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSP), and the like.

The base station communication module 925 may manage communications with other base stations 105. In some cases, a communications management module may include a controller or scheduler for controlling communications with UEs 115 in cooperation with other base stations 105. For example, the base station communications module 925 may coordinate scheduling for transmissions to UEs 115 for various interference mitigation techniques such as beamforming or joint transmission.

The components of wireless device 500, wireless device 600, subframe availability module 510, UE 115-e, or base station 105-d may each, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
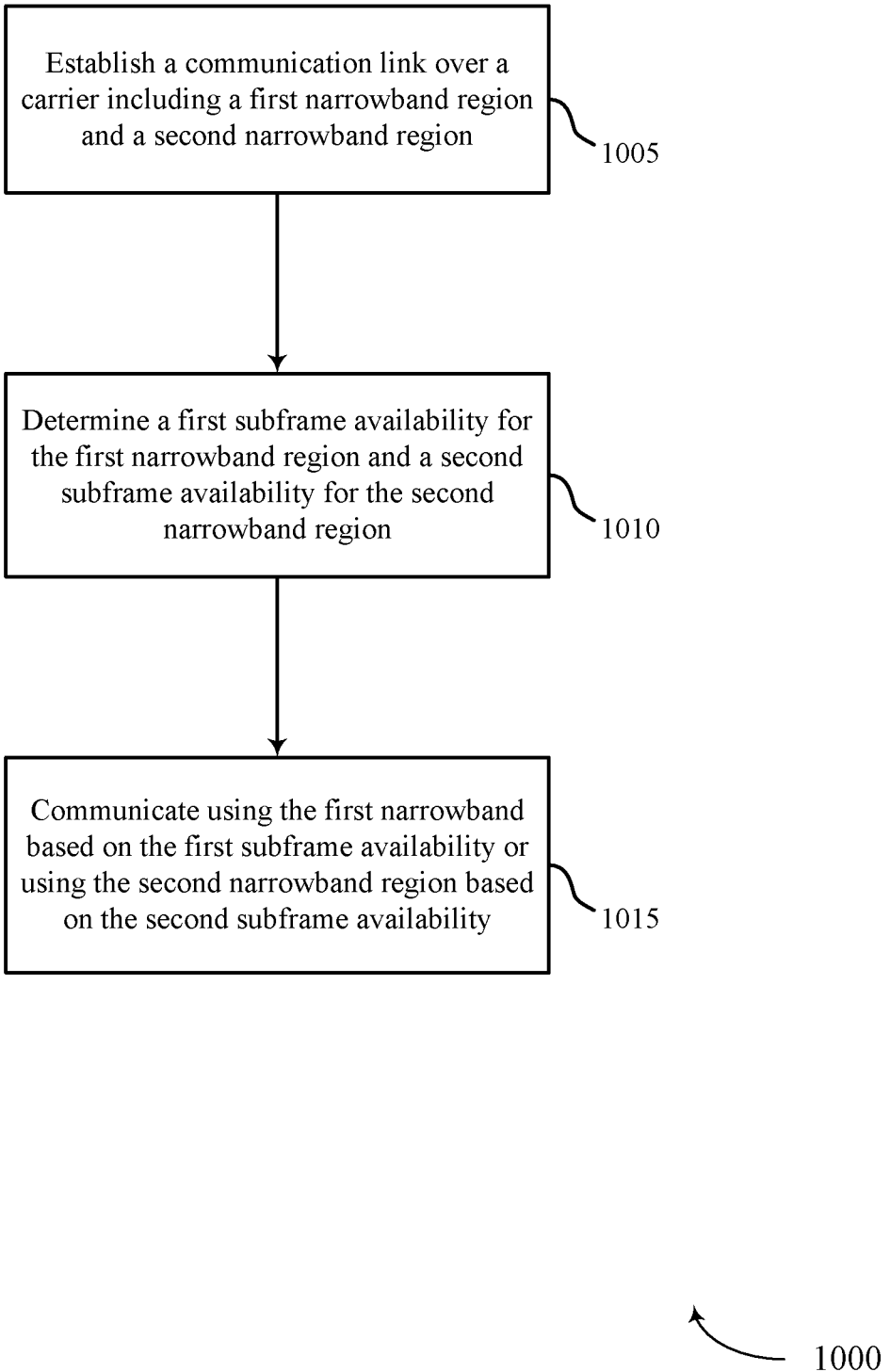
FIGS. 10-15 illustrate methods for narrowband dependent subframe availability determination or utilization in accordance with various aspects of the present disclosure.

FIG. 10 shows a flowchart illustrating a method 1000 for narrowband dependent subframe availability determination or utilization in accordance with various aspects of the present disclosure. The operations of method 1000 may be implemented by a UE 115 or base station 105 or its components as described with reference to FIGS. 1-9. For example, the operations of method 1000 may be performed by the subframe availability module 510 as described with reference to FIGS. 5-8. In some examples, a wireless device may execute a set of codes to control the functional elements of the wireless device to perform the functions described below. Additionally or alternatively, the wireless device may perform aspects the functions described below using special-purpose hardware.

At block 1005, the wireless device may establish a communication link over a carrier including a first narrowband region and a second narrowband region as described with reference to FIGS. 2-4. In certain examples, the operations of block 1005 may be performed by the narrowband communication module 605 as described with reference to FIG. 6.

At block 1010, the wireless device may determine a first subframe availability for the first narrowband region and a second subframe availability for the second narrowband region as described with reference to FIGS. 2-4. In certain examples, the operations of block 1010 may be performed by the availability determination module 610 as described with reference to FIG. 6.

At block 1015, the wireless device may communicate using the first narrowband region based at least in part on the first subframe availability or using the second narrowband region based at least in part on the second subframe availability as described with reference to FIGS. 2-4. In certain examples, the operations of block 1015 may be performed by the availability based communications module 615 as described with reference to FIG. 6.

Figure 11:
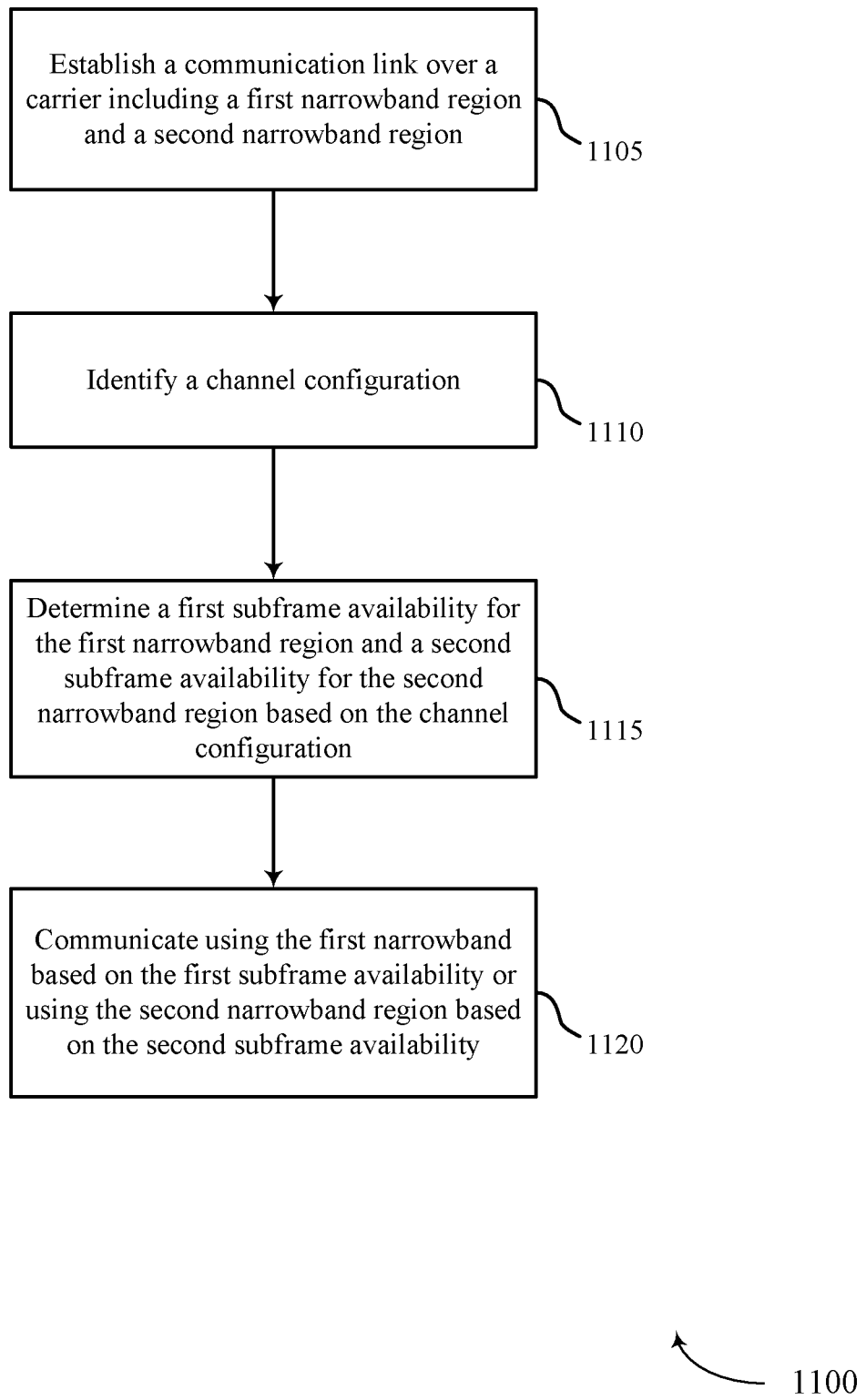

FIG. 11 shows a flowchart illustrating a method 1100 for narrowband dependent subframe availability determination or utilization in accordance with various aspects of the present disclosure. The operations of method 1100 may be implemented by a UE 115 or base station 105 or its components as described with reference to FIGS. 1-9. For example, the operations of method 1100 may be performed by the subframe availability module 510 as described with reference to FIGS. 5-8. In some examples, a wireless device may execute a set of codes to control the functional elements of the wireless device to perform the functions described below. Additionally or alternatively, the wireless device may perform aspects the functions described below using special-purpose hardware. The method 1100 may also incorporate aspects of method 1000 of FIG. 10.

At block 1105, the wireless device may establish a communication link over a carrier including a first narrowband region and a second narrowband region as described with reference to FIGS. 2-4. In certain examples, the operations of block 1105 may be performed by the narrowband communication module 605 as described with reference to FIG. 6.

At block 1110, the wireless device may identify a channel configuration as described with reference to FIGS. 2-4. In certain examples, the operations of block 1110 may be performed by the channel configuration module 705 as described with reference to FIG. 7.

At block 1115, the wireless device may determine a first subframe availability for the first narrowband region and a second subframe availability for the second narrowband region as described with reference to FIGS. 2-4. In some cases, the first subframe availability and the second subframe availability are determined based at least in part on the channel configuration. In certain examples, the operations of block 1115 may be performed by the availability determination module 610 as described with reference to FIG. 6.

At block 1120, the wireless device may communicate using the first narrowband region based at least in part on the first subframe availability or using the second narrowband region based at least in part on the second subframe availability as described with reference to FIGS. 2-4. In certain examples, the operations of block 1120 may be performed by the availability based communications module 615 as described with reference to FIG. 6.

Figure 12:
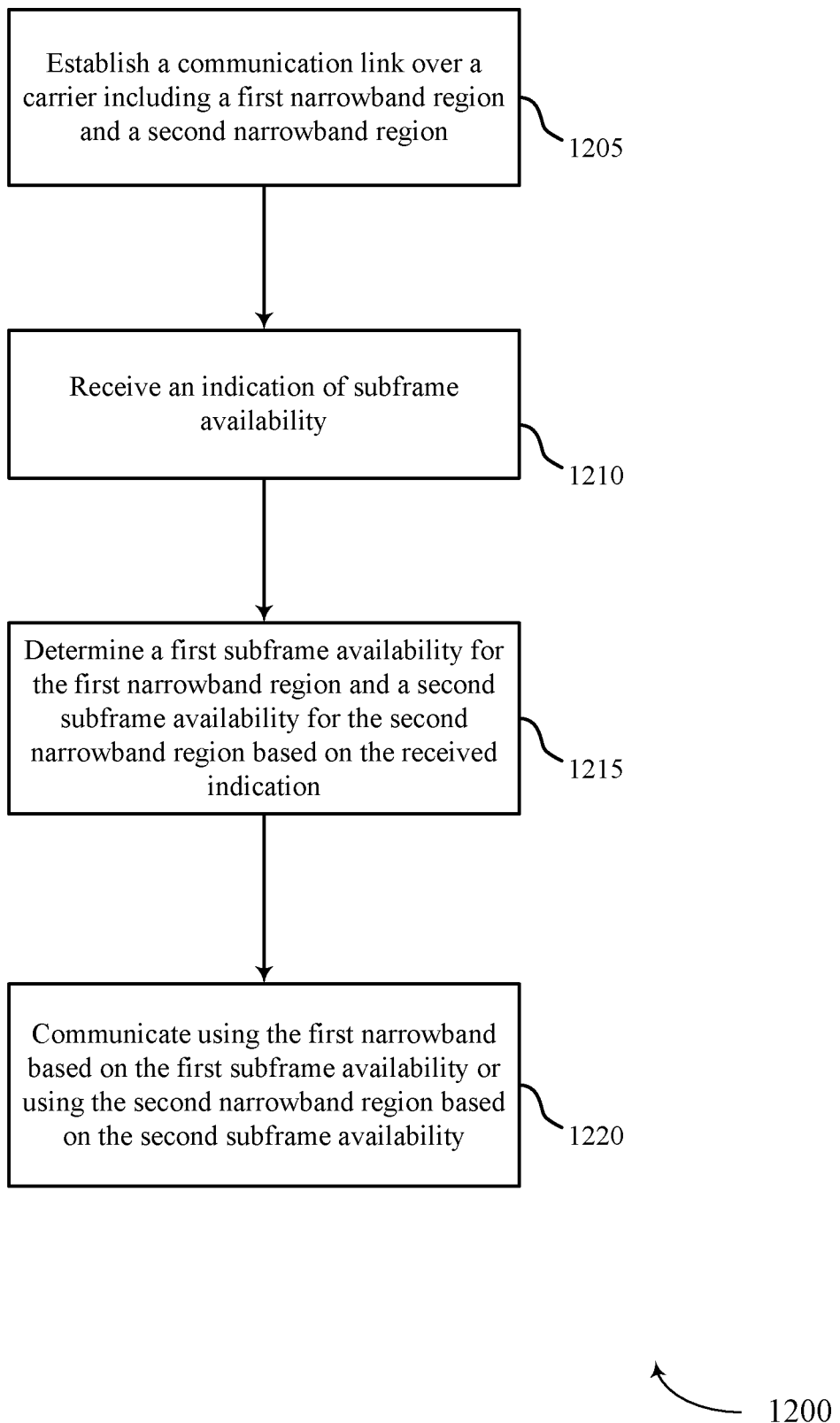

FIG. 12 shows a flowchart illustrating a method 1200 for narrowband dependent subframe availability determination or utilization in accordance with various aspects of the present disclosure. The operations of method 1200 may be implemented by a UE 115 or base station 105 or its components as described with reference to FIGS. 1-9. For example, the operations of method 1200 may be performed by the subframe availability module 510 as described with reference to FIGS. 5-8. In some examples, a wireless device may execute a set of codes to control the functional elements of the wireless device to perform the functions described below. Additionally or alternatively, the wireless device may perform aspects the functions described below using special-purpose hardware. The method 1200 may also incorporate aspects of methods 1000, and 1100 of FIGS. 10-11.

At block 1205, the wireless device may establish a communication link over a carrier including a first narrowband region and a second narrowband region as described with reference to FIGS. 2-4. In certain examples, the operations of block 1205 may be performed by the narrowband communication module 605 as described with reference to FIG. 6.

At block 1210, the wireless device may receive an indication of subframe availability, such that the first or second subframe availability is determined based at least in part on the received indication as described with reference to FIGS. 2-4. In certain examples, the operations of block 1210 may be performed by the receiver 505 as described with reference to FIG. 5.

At block 1215, the wireless device may determine a first subframe availability for the first narrowband region and a second subframe availability for the second narrowband region as described with reference to FIGS. 2-4. In certain examples, the operations of block 1215 may be performed by the availability determination module 610 as described with reference to FIG. 6.

At block 1220, the wireless device may communicate using the first narrowband region based at least in part on the first subframe availability or using the second narrowband region based at least in part on the second subframe availability as described with reference to FIGS. 2-4. In certain examples, the operations of block 1220 may be performed by the availability based communications module 615 as described with reference to FIG. 6.

Figure 13:
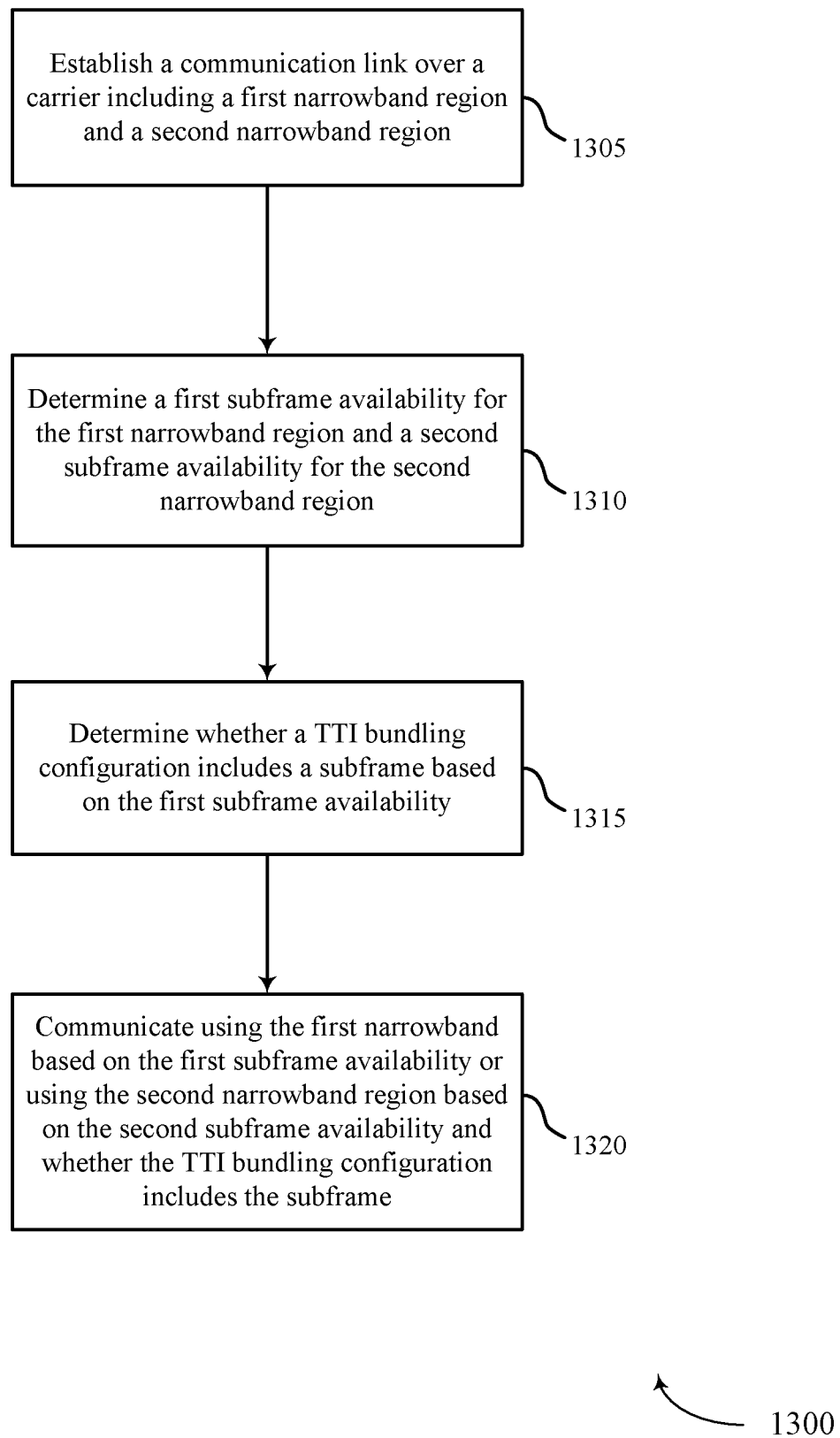

FIG. 13 shows a flowchart illustrating a method 1300 for narrowband dependent subframe availability determination or utilization in accordance with various aspects of the present disclosure. The operations of method 1300 may be implemented by a UE 115 or base station 105 or its components as described with reference to FIGS. 1-9. For example, the operations of method 1300 may be performed by the subframe availability module 510 as described with reference to FIGS. 5-8. In some examples, a wireless device may execute a set of codes to control the functional elements of the wireless device to perform the functions described below. Additionally or alternatively, the wireless device may perform aspects the functions described below using special-purpose hardware. The method 1300 may also incorporate aspects of methods 1000, 1100, and 1200 of FIGS. 10-12.

At block 1305, the wireless device may establish a communication link over a carrier including a first narrowband region and a second narrowband region as described with reference to FIGS. 2-4. In certain examples, the operations of block 1305 may be performed by the narrowband communication module 605 as described with reference to FIG. 6.

At block 1310, the wireless device may determine a first subframe availability for the first narrowband region and a second subframe availability for the second narrowband region as described with reference to FIGS. 2-4. In certain examples, the operations of block 1310 may be performed by the availability determination module 610 as described with reference to FIG. 6.

At block 1315, the wireless device may determine whether a TTI bundling configuration includes a subframe based at least in part on the first subframe availability as described with reference to FIGS. 2-4. In certain examples, the operations of block 1315 may be performed by the TTI bundling module 710 as described with reference to FIG. 7.

At block 1320, the wireless device may communicate using the first narrowband region based at least in part on the first subframe availability or using the second narrowband region based at least in part on the second subframe availability as described with reference to FIGS. 2-4. In certain examples, the operations of block 1320 may be performed by the availability based communications module 615 as described with reference to FIG. 6.

Figure 14:
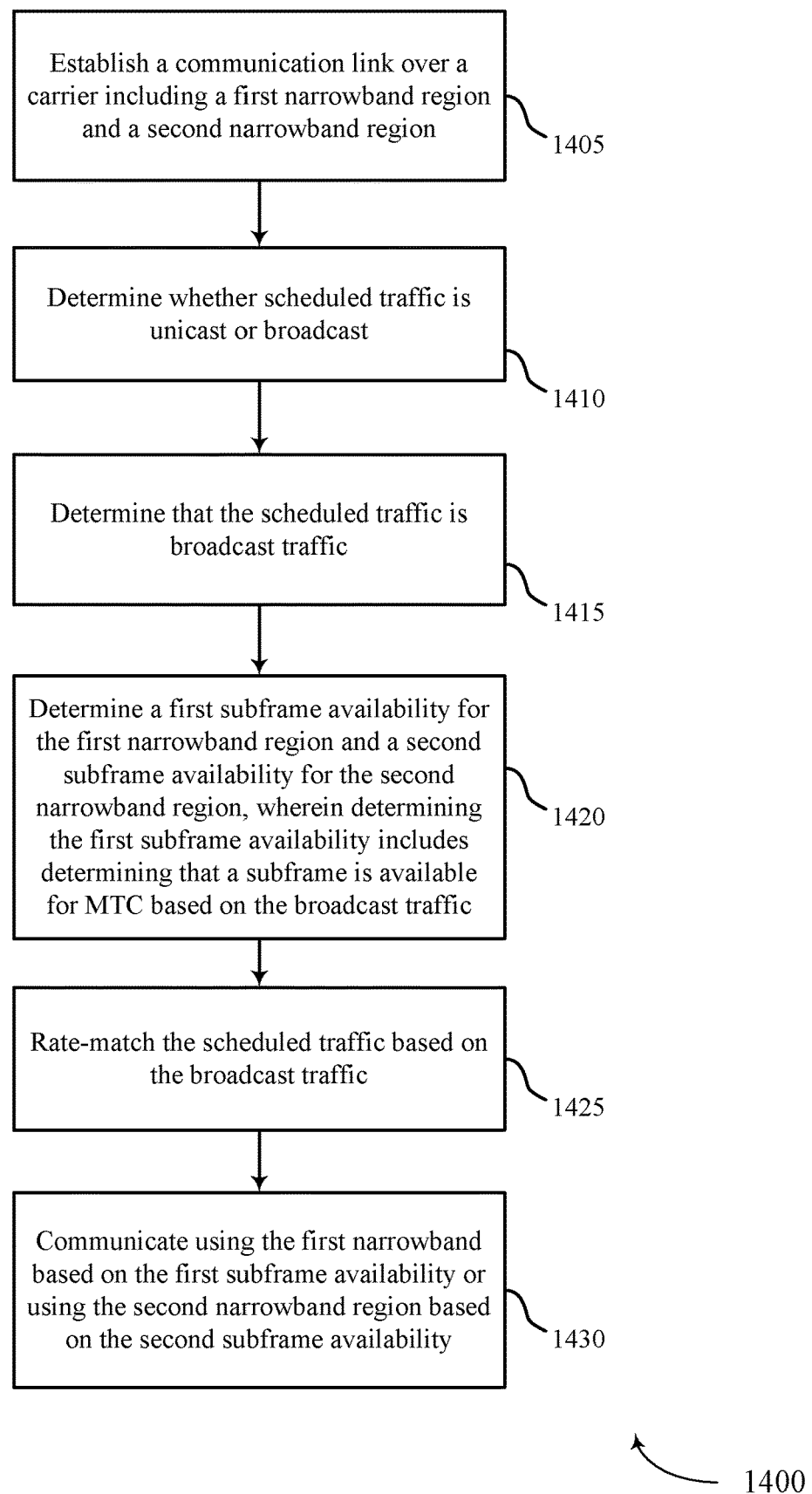

FIG. 14 shows a flowchart illustrating a method 1400 for narrowband dependent subframe availability determination or utilization in accordance with various aspects of the present disclosure. The operations of method 1400 may be implemented by a UE 115 or base station 105 or its components as described with reference to FIGS. 1-9. For example, the operations of method 1400 may be performed by the subframe availability module 510 as described with reference to FIGS. 5-8. In some examples, a wireless device may execute a set of codes to control the functional elements of the wireless device to perform the functions described below. Additionally or alternatively, the wireless device may perform aspects the functions described below using special-purpose hardware. The method 1400 may also incorporate aspects of methods 1000, 1100, 1200, and 1300 of FIGS. 10-13.

At block 1405, the wireless device may establish a communication link over a carrier including a first narrowband region and a second narrowband region as described with reference to FIGS. 2-4. In certain examples, the operations of block 1405 may be performed by the narrowband communication module 605 as described with reference to FIG. 6.

At block 1410, the wireless device may determine whether scheduled traffic is unicast or broadcast, such that the first subframe availability is determined based at least in part on whether the scheduled traffic is unicast or broadcast as described with reference to FIGS. 2-4. In certain examples, the operations of block 1410 may be performed by the traffic type module 720 as described with reference to FIG. 7.

At block 1415, the wireless device may determine that the scheduled traffic is broadcast traffic, such that determining the first subframe availability includes determining that a subframe is available for MTC based at least in part on the broadcast traffic as described with reference to FIGS. 2-4. In some examples, the wireless device may determine that a subframe is at least partially unavailable for narrowband communications based on determining that the scheduled traffic is broadcast traffic. In certain examples, the operations of block 1415 may be performed by the traffic type module 720 as described with reference to FIG. 7.

At block 1420, the wireless device may determine a first subframe availability for the first narrowband region and a second subframe availability for the second narrowband region as described with reference to FIGS. 2-4. In certain examples, the operations of block 1420 may be performed by the availability determination module 610 as described with reference to FIG. 6.

At block 1425, the wireless device may rate-match the scheduled traffic based at least in part on the broadcast traffic as described with reference to FIGS. 2-4. In certain examples, the operations of block 1425 may be performed by the rate matching module 725 as described with reference to FIG. 7.

At block 1430, the wireless device may communicate using the first narrowband region based at least in part on the first subframe availability or using the second narrowband region based at least in part on the second subframe availability as described with reference to FIGS. 2-4. In certain examples, the operations of block 1430 may be performed by the availability based communications module 615 as described with reference to FIG. 6.

Figure 15:
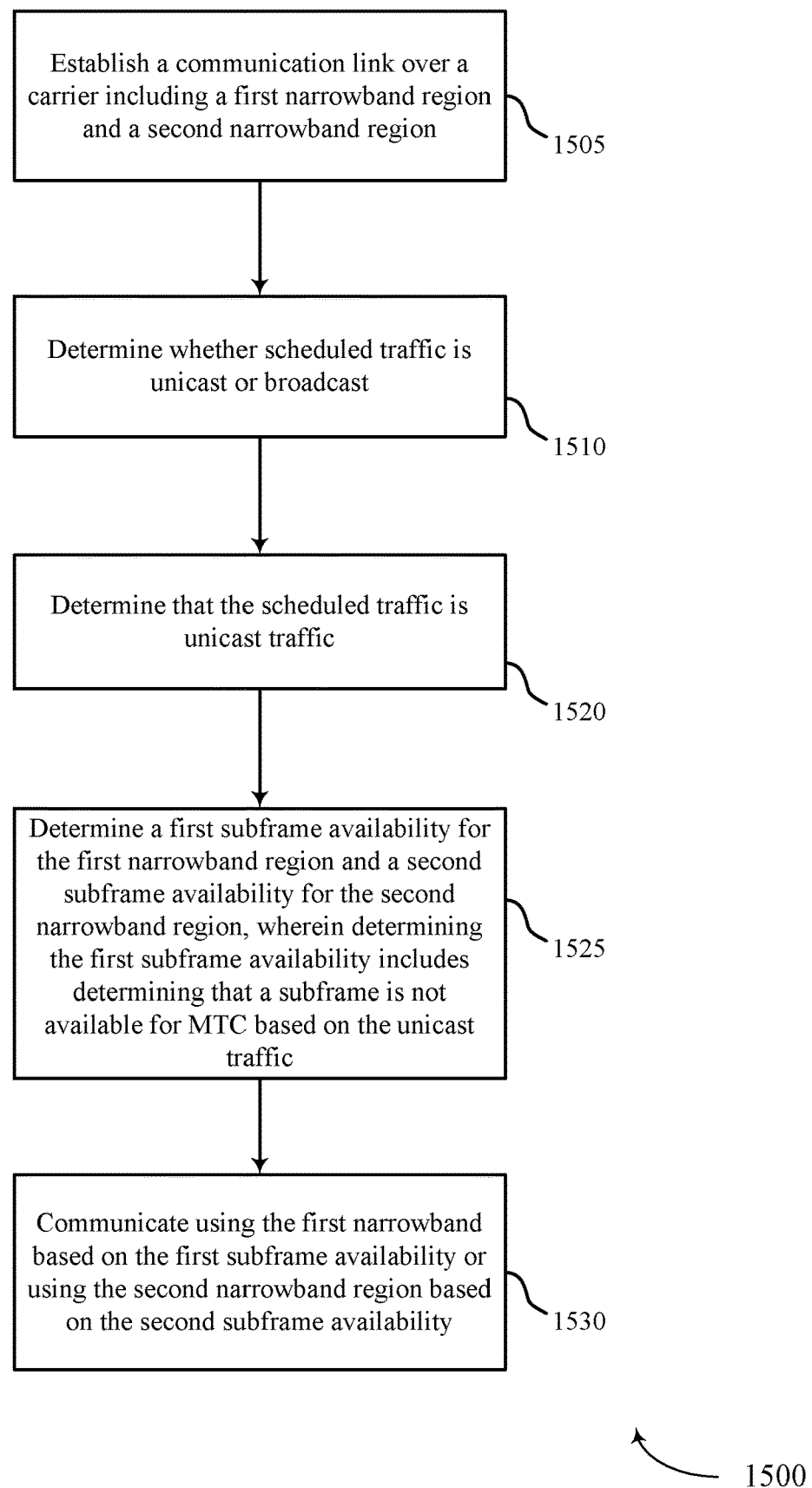

FIG. 15 shows a flowchart illustrating a method 1500 for narrowband dependent subframe availability determination or utilization in accordance with various aspects of the present disclosure. The operations of method 1500 may be implemented by a UE 115 or base station 105 or its components as described with reference to FIGS. 1-9. For example, the operations of method 1500 may be performed by the subframe availability module 510 as described with reference to FIGS. 5-8. In some examples, a wireless device may execute a set of codes to control the functional elements of the wireless device to perform the functions described below. Additionally or alternatively, the wireless device may perform aspects the functions described below using special-purpose hardware. The method 1500 may also incorporate aspects of methods 1000, 1100, 1200, 1300, and 1400 of FIGS. 10-14.

At block 1505, the wireless device may establish a communication link over a carrier including a first narrowband region and a second narrowband region as described with reference to FIGS. 2-4. In certain examples, the operations of block 1505 may be performed by the narrowband communication module 605 as described with reference to FIG. 6.

At block 1510, the wireless device may determine whether scheduled traffic is unicast or broadcast, such that the first subframe availability is determined based at least in part on whether the scheduled traffic is unicast or broadcast as described with reference to FIGS. 2-4. In certain examples, the operations of block 1510 may be performed by the traffic type module 720 as described with reference to FIG. 7.

At block 1515, the wireless device may determine that the scheduled traffic is unicast traffic, such that determining the first subframe availability includes determining that a subframe is at least partially unavailable for MTC based at least in part on the unicast traffic as described with reference to FIGS. 2-4. In some examples, the wireless device may determine that a subframe is available for narrowband communications based on a determination that the subframe is at least partially unavailable for broadcast traffic (e.g., it is available for unicast traffic). In certain examples, the operations of block 1515 may be performed by the traffic type module 720 as described with reference to FIG. 7.

At block 1520, the wireless device may determine a first subframe availability for the first narrowband region and a second subframe availability for the second narrowband region as described with reference to FIGS. 2-4. In certain examples, the operations of block 1520 may be performed by the availability determination module 610 as described with reference to FIG. 6.

At block 1525, the wireless device may communicate using the first narrowband region based at least in part on the first subframe availability or using the second narrowband region based at least in part on the second subframe availability as described with reference to FIGS. 2-4. In certain examples, the operations of block 1525 may be performed by the availability based communications module 615 as described with reference to FIG. 6.

Thus, methods 1000, 1100, 1200, 1300, 1400, and 1500 may provide for narrowband dependent subframe availability for MTC. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, Universal Mobile Telecommunications System (UMTS), LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNB) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
    establishing a communication link over a carrier comprising a first narrowband region and a second narrowband region;
    identifying in which one or more subframes a reference signal is present and in which one of the first narrowband region and the second narrowband region the reference signal is present;
    determining, based at least in part on the identifying, a first subframe availability for the first narrowband region and a second subframe availability for the second narrowband region; and
    communicating data using the first narrowband region in a first subframe of the one or more subframes based at least in part on the first subframe availability or using the second narrowband region in the first subframe based at least in part on the second subframe availability.

2. The method of claim 1, wherein the identifying comprises identifying a reference signal configuration indicating a bandwidth less than a bandwidth of the carrier.

3. The method of claim 2, wherein the reference signal configuration comprises a positioning reference signal configuration, a discovery reference signal configuration, a primary synchronization signal (PSS) configuration, a secondary synchronization signal (SSS) configuration, a physical broadcast channel (PBCH) configuration, or any combination thereof.

4. The method of claim 1, further comprising:
    determining a subsequent subframe availability for the first narrowband region based at least in part on the identifying.

5. The method of claim 1, wherein determining the first subframe availability comprises:
    determining that a subframe is available for machine type communication (MTC), determining that the subframe is at least partially unavailable for MTC, or determining that a portion of the subframe is available for MTC.

6. The method of claim 1, wherein the first subframe availability is different from the second subframe availability.

7. The method of claim 1, further comprising:
    receiving an indication of subframe availability, the indication being a configuration of one or more reference signals with a bandwidth, a repetition pattern, and a periodicity, wherein the first or second subframe availability is determined based at least in part on the received indication.

8. The method of claim 1, further comprising:
    receiving an indication of subframe availability, the indication being a configuration indicating the first subframe availability separately from the second subframe availability.

9. The method of claim 1, wherein determining the first subframe availability comprises:
    determining that a subframe is available for the first narrowband region based at least in part on a first reference signal; and
    wherein determining the second subframe availability comprises determining that the subframe is at least partially unavailable for the second narrowband region based at least in part on a second reference signal.

10. The method of claim 9, wherein the first reference signal is cell-specific and the second reference signal is user equipment (UE) specific.

11. The method of claim 1, further comprising:
    determining whether a transmission time interval (TTI) bundling configuration includes a subframe based at least in part on the first subframe availability.

12. The method of claim 1, further comprising:
    determining a transmission time interval (TTI) bundling configuration based at least in part on the first subframe availability.

13. The method of claim 12, further comprising:
    identifying a frequency hopping configuration for the TTI bundling configuration based at least in part on the first subframe availability.

14. The method of claim 1, further comprising:
    determining whether scheduled traffic is unicast or broadcast, wherein the first subframe availability is determined based at least in part on whether the scheduled traffic is unicast or broadcast.

15. The method of claim 14, further comprising:
    determining that the scheduled traffic is broadcast traffic, wherein determining the first subframe availability comprises determining that a subframe is available for machine type communication (MTC) based at least in part on the broadcast traffic; and
    rate-matching the scheduled traffic based at least in part on the broadcast traffic.

16. The method of claim 14, further comprising:
    determining that the scheduled traffic is unicast traffic, wherein determining the first subframe availability comprises determining that a subframe is at least partially unavailable for machine type communication (MTC) based at least in part on the unicast traffic.

17. The method of claim 14, further comprising:
    determining that the scheduled traffic is broadcast traffic, wherein determining the first subframe availability comprises determining that a subframe is at least partially unavailable for narrowband communications based at least in part on the broadcast traffic.

18. The method of claim 1, further comprising:
determining that a system bandwidth is less than a threshold, wherein determining the first subframe availability comprises determining that a subframe is at least partially unavailable for paging traffic based at least in part on determining that the system bandwidth is less than the threshold.

19. The method of claim 14, further comprising:
determining a frequency hopping configuration based at least in part on determining whether the scheduled traffic is unicast or broadcast.

20. The method of claim 1, wherein the first narrowband region comprises a first set of resource blocks and the second narrowband region comprises a second set of resource blocks distinct from the first set of resource blocks.

21. The method of claim 1, wherein determining the first subframe availability further comprises:
determining that the first subframe is unavailable based at least in part on at least one reference signal overlapping with the first narrowband region during the first subframe.

22. The method of claim 1, further comprising:
receiving an indication of subframe availability comprising a reference signal configuration.

23. The method of claim 1, wherein determining the first subframe availability for the first narrowband region further comprises:
determining that the first narrowband region of the first subframe is available based at least in part on identifying that the reference signal is not present within the first narrowband region of the first subframe, wherein the data is communicated within the first narrowband region of the first subframe.

24. An apparatus for wireless communication, comprising:
means for establishing a communication link over a carrier comprising a first narrowband region and a second narrowband region;
means for identifying in which one or more subframes a reference signal is present and in which one of the first narrowband region and the second narrowband region the reference signal is present;
means for determining, based at least in part on the identifying, a first subframe availability for the first narrowband region and a second subframe availability for the second narrowband region; and
means for data using the first narrowband region in a first subframe of the one or more subframes based at least in part on the first subframe availability or using the second narrowband region in the first subframe based at least in part on the second subframe availability.

25. An apparatus for wireless communication, comprising:
a processor;
memory coupled to the processor; and
instructions stored in the memory and operable, when executed by the processor, to cause the apparatus to:
establish a communication link over a carrier comprising a first narrowband region and a second narrowband region;
identify in which one or more subframes a reference signal is present and in which one of the first narrowband region and the second narrowband region the reference signal is present;
determine, based at least in part on the identifying, a first subframe availability for the first narrowband region and a second subframe availability for the second narrowband region; and
communicate data using the first narrowband region in a first subframe of the one or more subframes based at least in part on the first subframe availability or using the second narrowband region in the first subframe based at least in part on the second subframe availability.

26. The apparatus of claim 25, wherein the instructions are operable to cause the apparatus to:
determine a subsequent subframe availability for the first narrowband region based at least in part on the identifying.

27. The apparatus of claim 25, wherein the instructions are operable to cause the apparatus to:
determine that a subframe is available for MTC, determine that the subframe is at least partially unavailable for MTC, or determine that a portion of the subframe is available for MTC.

28. The apparatus of claim 25, wherein the instructions are operable to cause the apparatus to:
receive an indication of subframe availability, the indication being a configuration of one or more reference signals with a bandwidth, a repetition pattern, and a periodicity, wherein the first or second subframe availability is determined based at least in part on the received indication.

29. The apparatus of claim 25, wherein the instructions are operable to cause the apparatus to:
determine that a subframe is available for the first narrowband region based at least in part on a first reference signal; and
determine that the subframe is at least partially unavailable for the second narrowband region based at least in part on a second reference signal.

30. The apparatus of claim 25, wherein the instructions are operable to cause the apparatus to:
determine whether a transmission time interval (TTI) bundling configuration includes a subframe based at least in part on the first subframe availability.

31. The apparatus of claim 25, wherein the instructions are operable to cause the apparatus to:
determine a transmission time interval (TTI) bundling configuration based at least in part on the first subframe availability.

32. A non-transitory computer-readable medium storing code for wireless communication, the code comprising instructions executable to:
establish a communication link over a carrier comprising a first narrowband region and a second narrowband region;
identify in which one or more subframes a reference signal is present and in which one of the first narrowband region and the second narrowband region the reference signal is present;
determine, based at least in part on the identifying, a first subframe availability for the first narrowband region and a second subframe availability for the second narrowband region; and
communicate data using the first narrowband region in a first subframe of the one or more subframes based at least in part on the first subframe availability or using the second narrowband region in the first subframe based at least in part on the second subframe availability.

* * * * *